*INVENTOR.*
GEORGE GORHAM
*ATTORNEY*

July 22, 1952  G. GORHAM  2,604,249
AUTOMATIC FRACTION-COLLECTION APPARATUS
Filed Sept. 5, 1947  8 Sheets-Sheet 3
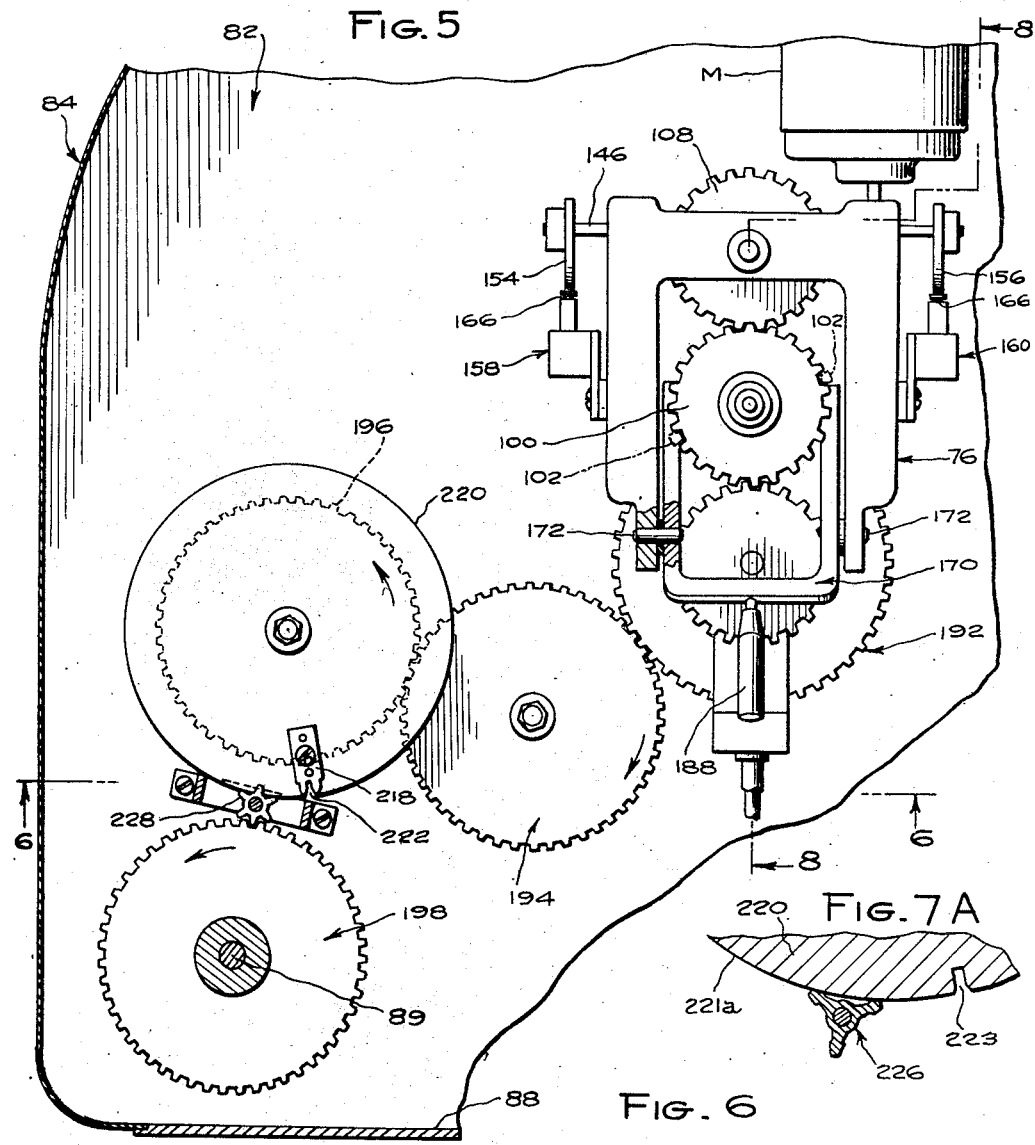
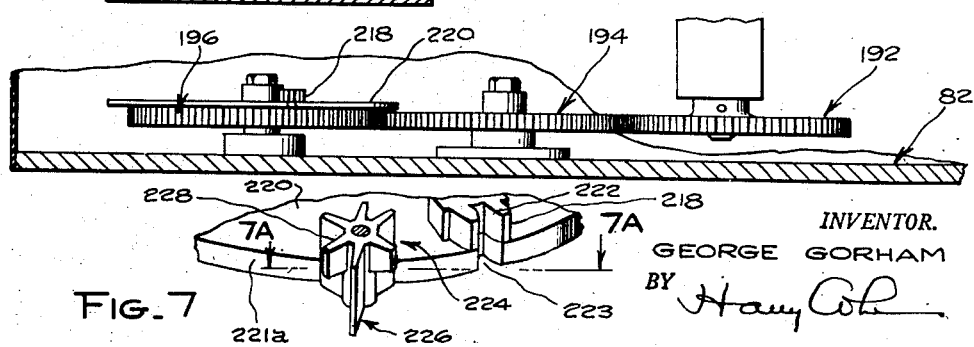
INVENTOR.
GEORGE GORHAM
BY Harry Cole
ATTORNEY

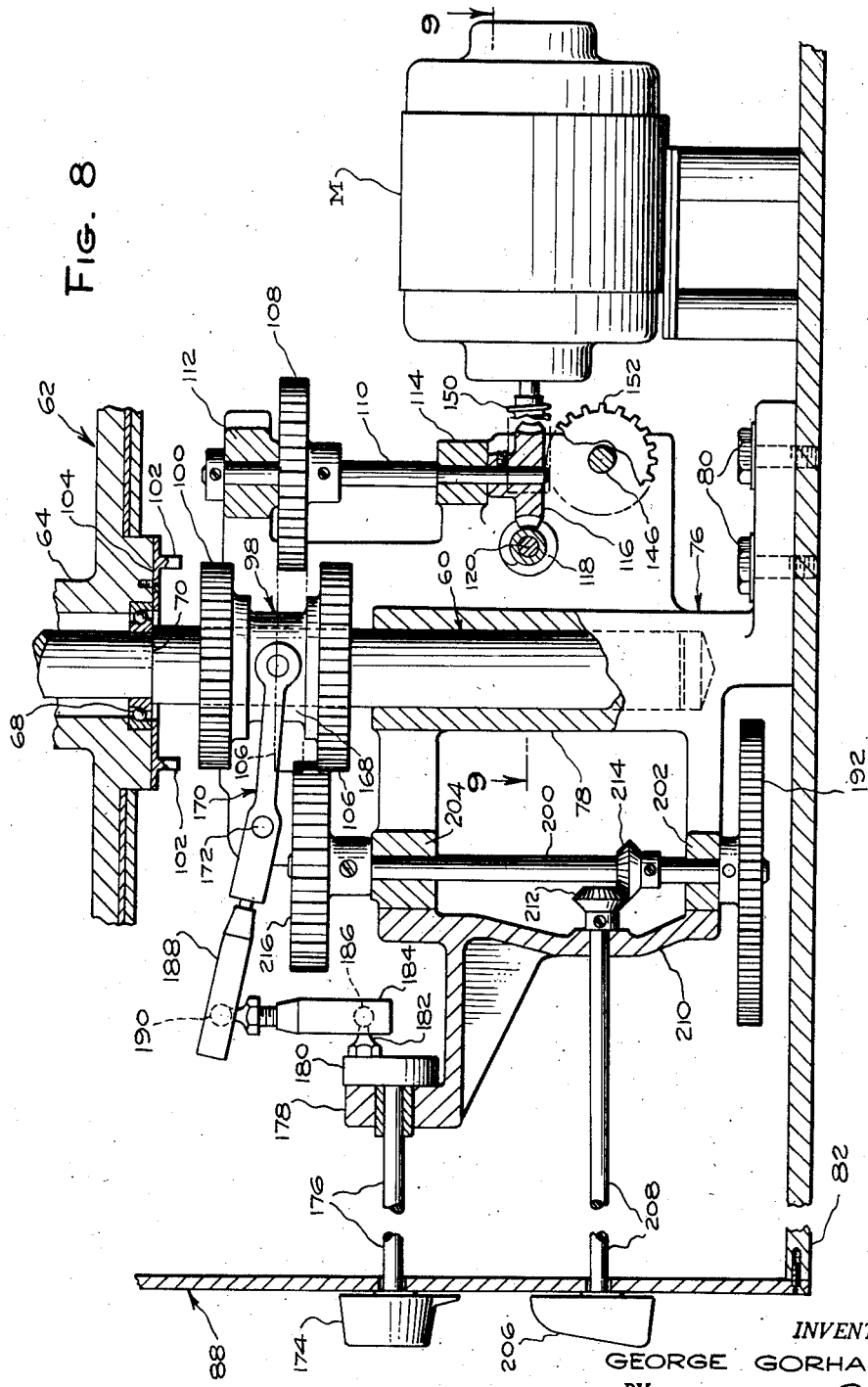

July 22, 1952 — G. GORHAM — 2,604,249
AUTOMATIC FRACTION-COLLECTION APPARATUS
Filed Sept. 5, 1947 — 8 Sheets-Sheet 5
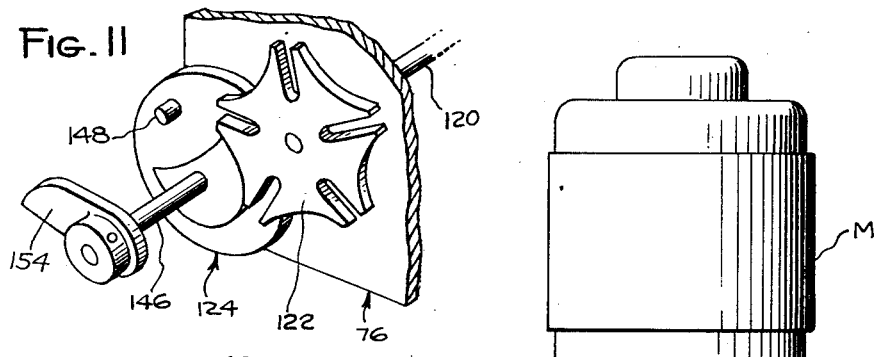
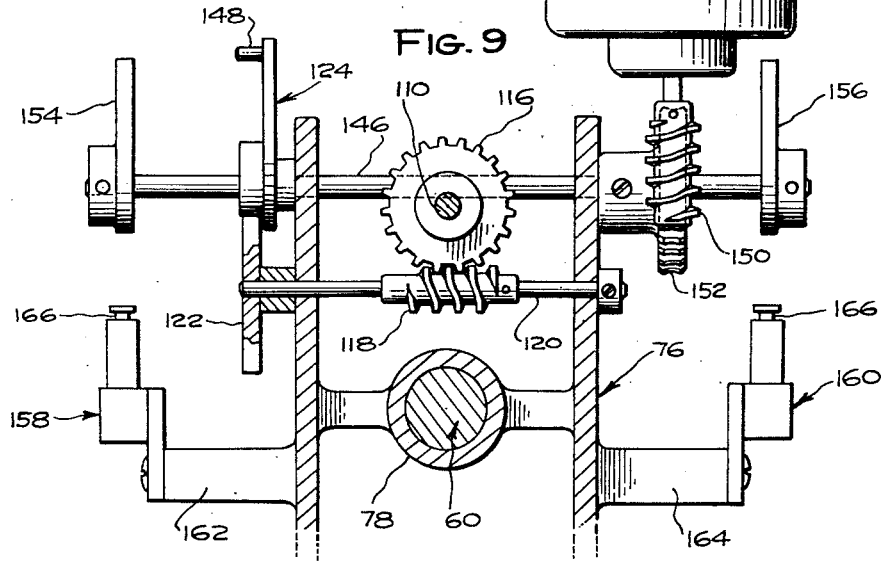
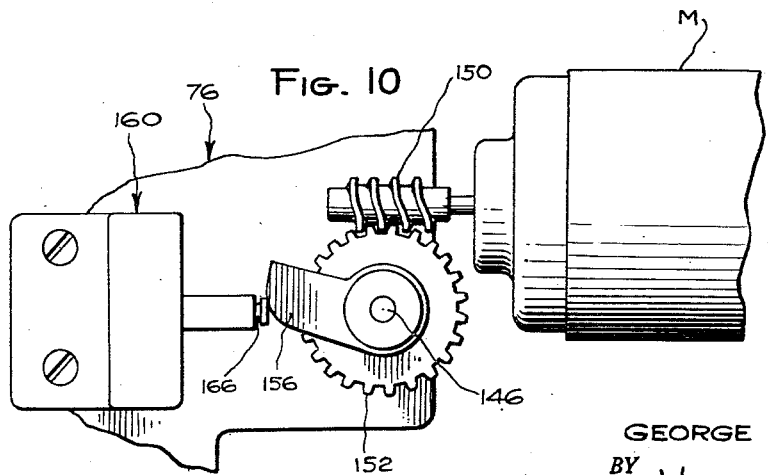
INVENTOR.
GEORGE GORHAM
BY Harry Cole
ATTORNEY July 22, 1952  G. GORHAM  2,604,249
AUTOMATIC FRACTION-COLLECTION APPARATUS
Filed Sept. 5, 1947  8 Sheets-Sheet 6
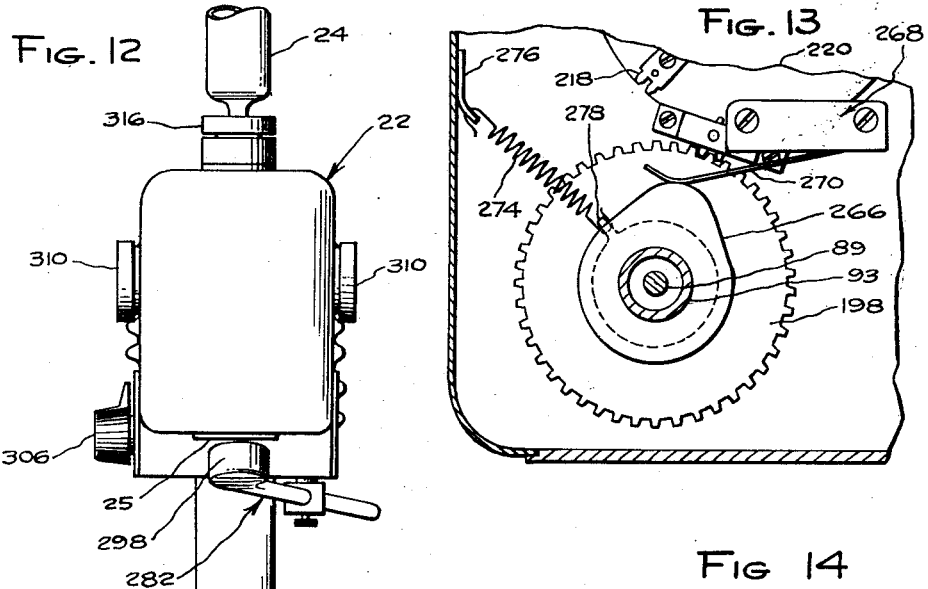
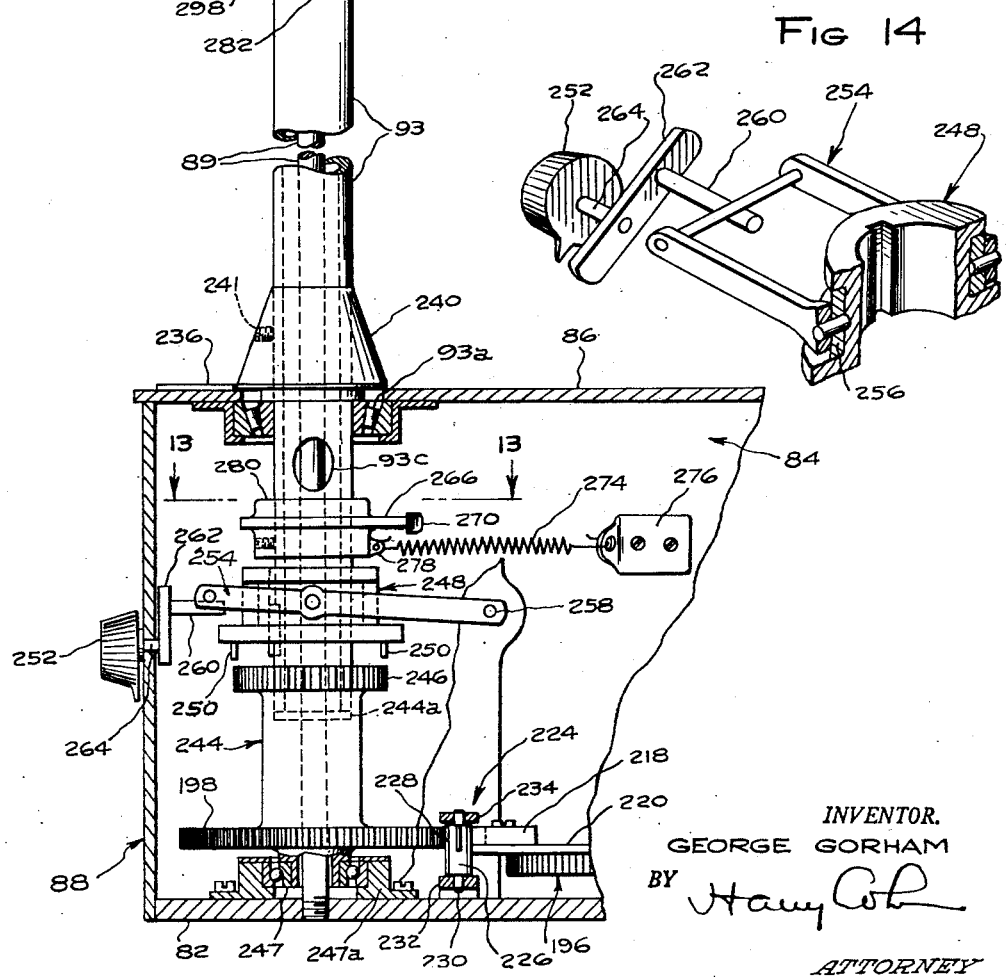
INVENTOR.
GEORGE GORHAM
BY Harry Cole
ATTORNEY July 22, 1952 — G. GORHAM — 2,604,249
AUTOMATIC FRACTION-COLLECTION APPARATUS
Filed Sept. 5, 1947 — 8 Sheets-Sheet 7
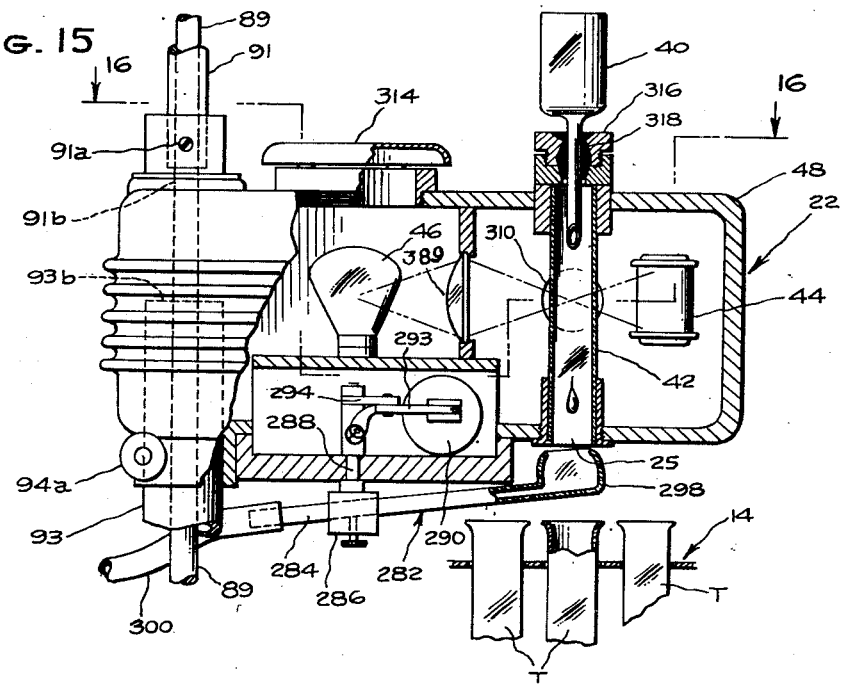
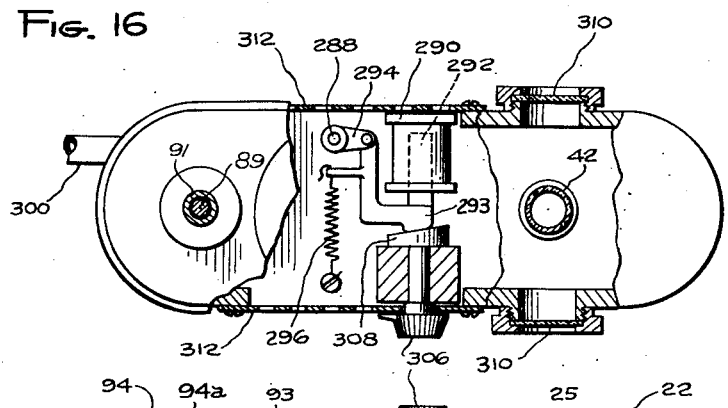
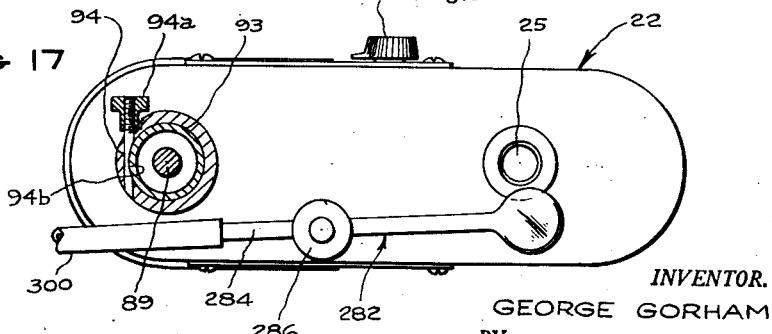
INVENTOR.
GEORGE GORHAM
BY Harry Cole
ATTORNEY

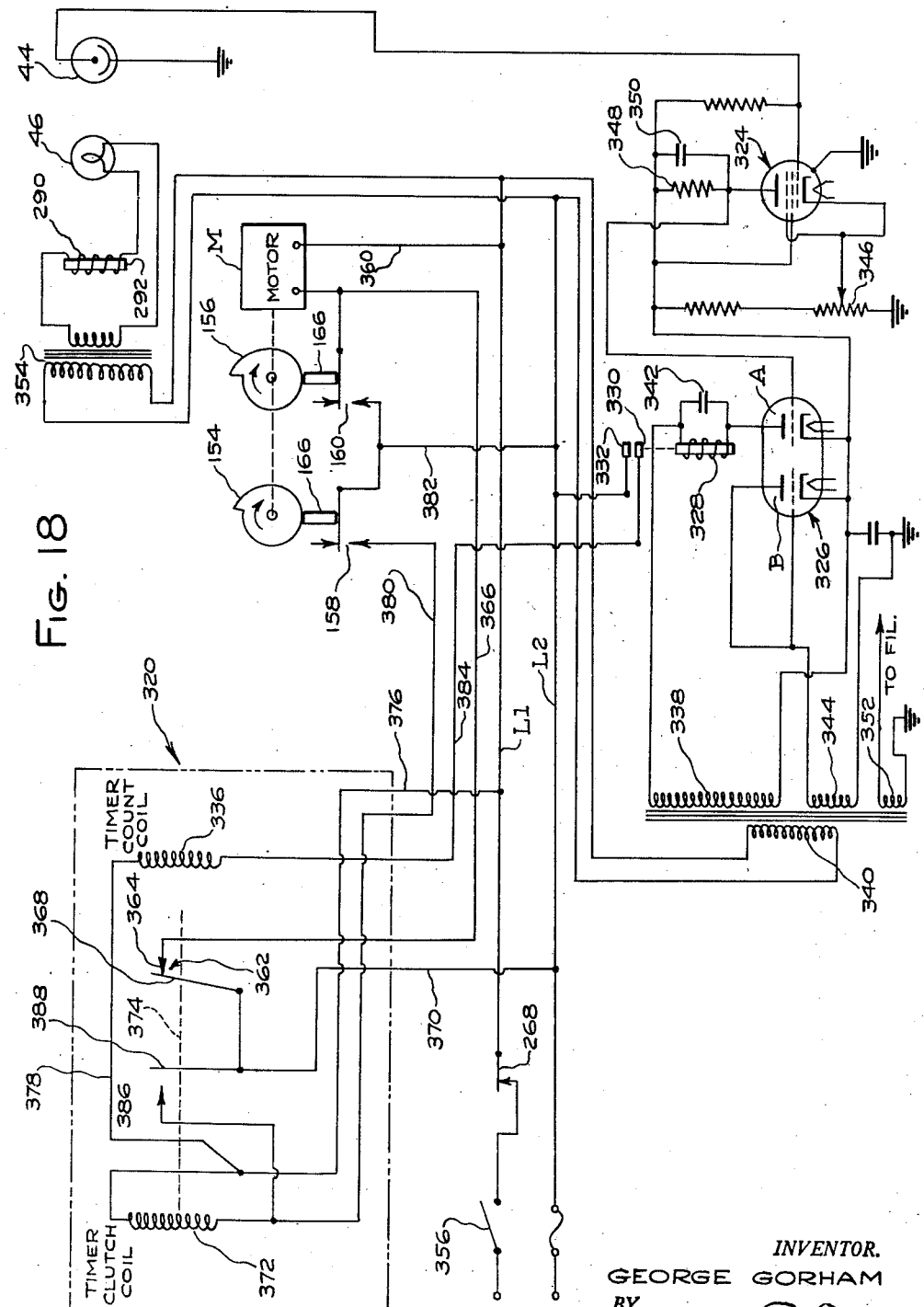

Patented July 22, 1952

2,604,249

UNITED STATES PATENT OFFICE 2,604,249

AUTOMATIC FRACTION-COLLECTION APPARATUS

George Gorham, New York, N. Y., assignor, by mesne assignments, to Technicon Chromatography Corporation, New York, N. Y., a corporation of New York Application September 5, 1947, Serial No. 772,389

50 Claims. (Cl. 226—96)

This invention relates to an automatic fraction-collection apparatus.

The primary object of the present invention is the provision of an automatically operable apparatus which is well adapted to supply a large number of individual receptacles with accurately measured quantities or fractions of liquid or other fluent substance. The apparatus of the present invention is intended primarily for use as a fraction-collector in chromatographic analysis, but it will be understood that the apparatus embodying the present invention may be used for other purposes.

The invention and the above mentioned and other objects, features and advantages thereof will be fully understood from the following description considered in connection with the accompanying illustrative drawings.

In the drawings:

Fig. 5 is a sectional view on the line 5—5 of Fig. 1;

Fig. 6 is a sectional view on the line 6—6 of Fig. 5;

Fig. 7 is a detailed perspective view of part of the apparatus;

Fig. 7A is a sectional view on the line 7A—7A of Fig. 7;

Fig. 8 is a vertical sectional view on the line 8—8 of Fig. 5;

Fig. 9 is a horizontal sectional view on the line 9—9 of Fig. 8;

Fig. 10 is a side view of certain of the parts of the apparatus;

Fig. 11 is a perspective view of a mechanism forming part of the apparatus;

Fig. 12 is a sectional view on the line 12—12 of Fig. 2 with parts shown in elevation;

Fig. 13 is a sectional view on the line 13—13 of Fig. 12;

Fig. 14 is a perspective view of a mechanism forming part of the apparatus, certain parts of said mechanism being shown in section;

Fig. 15 is a view partly in elevation and partly in section;

Fig. 16 is a sectional view on the line 16—16 of Fig. 15;

Fig. 17 is a bottom view of the control unit;

Fig. 18 is a circuit diagram of the electrical and electronic devices of the apparatus.

Figure 1:
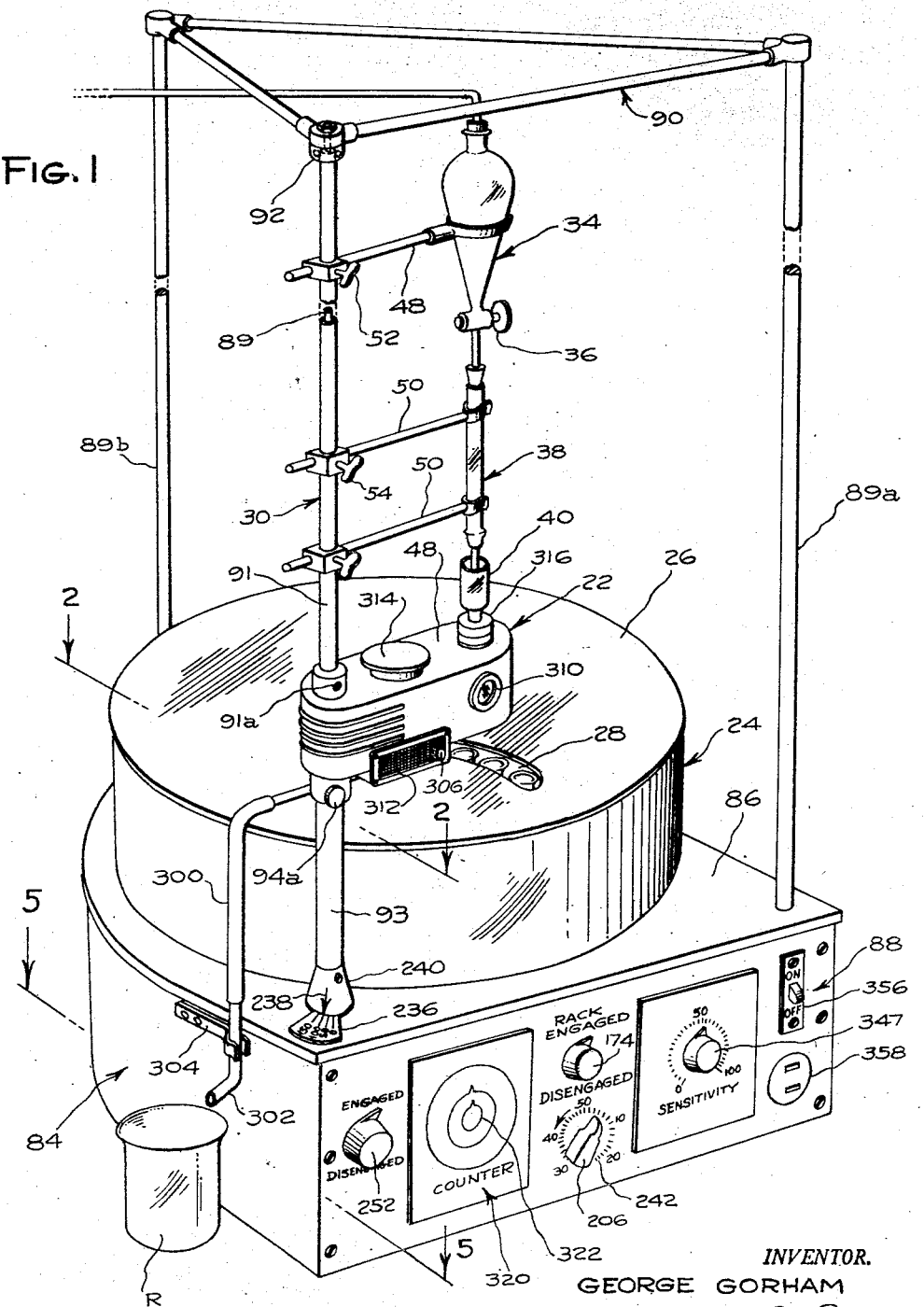
Fig. 1 is a perspective view of an automatic fraction-collector apparatus embodying the present invention.

Briefly described, the apparatus of the present invention comprises a movable rack on which a plurality of receptacles are arranged in each of a plurality of laterally related rows of each of which extends in the direction of movement of the rack. A control device having a passage therethrough for the liquid or other substance which is to be supplied to said receptacles is mounted for movement laterally of the receptacle-rows of the rack. The rack is moved step by step to carry each receptacle to a position at the outlet of the control device for the supply of the substance to each receptacle. When the substance is to be supplied to more than one row of receptacles, the control device is moved automatically from one row to another. Indexing mechanisms are provided for predetermining the number of receptacles which are to be supplied with the substance, and means including a timing device or counter are provided for accurately determining and measuring the quantity of substance to be supplied to each of said predetermined number of receptacles. An electric motor is utilized for actuating the rack-moving mechanism and for operating the indexing mechanisms, after the latter have been manually adjusted or set to determine the number of receptacles to be supplied or charged with the substance, whereby the operation of the apparatus is terminated as soon as the last receptacle is charged. The motor is stationary during the time each receptacle is being charged and as soon as it has received its predetermined charge or quantity of the particular substance, the motor is operated, under the control of the timing device, to move the rack another step for presenting the next receptacle in position to receive its charge. The apparatus preferably includes means to interrupt the supply of the substance to any one of the receptacles in case of defective operation of the apparatus and also at the end of the predetermined number of rack movements as set by the indexing mechanism.

The apparatus, in the form herein described, was specifically designed for a use as a fraction collector in chromatographic analysis. See for example, "Principles and Practice of Chromatography" by Zechmeister and Cholnoky, translater by Bachrach and Robinson, published by John Wiley & Sons, Inc., New York. In this particular use of the apparatus a liquid is passed through or in contact with an adsorbent substance of the column in a tube, according to known practice in the art of chromatography, and issues from the outlet of said tube drop by drop, and similarly passes, drop by drop, through the passage of the above mentioned control device. A photo-electric cell is disposed in said control unit and is operable, in response to the intermittent interruption of light by said drops, to control a relay which in turn controls the supply of electric pulses to the above mentioned counter whereby to measure the quantity of liquid supplied to each of the receptacles. It will be understood that the duration of the interval between two successive movements of the rack determines the quantity of liquid supplied to each receptacle, and that this interval of rest of the rack is controlled by the counter which, as explained above, controls the operations of the motor which moves the rack.

The apparatus will now be described in detail with reference to the above mentioned use thereof, but it will be understood that it may be used for other purposes.

Figure 2:
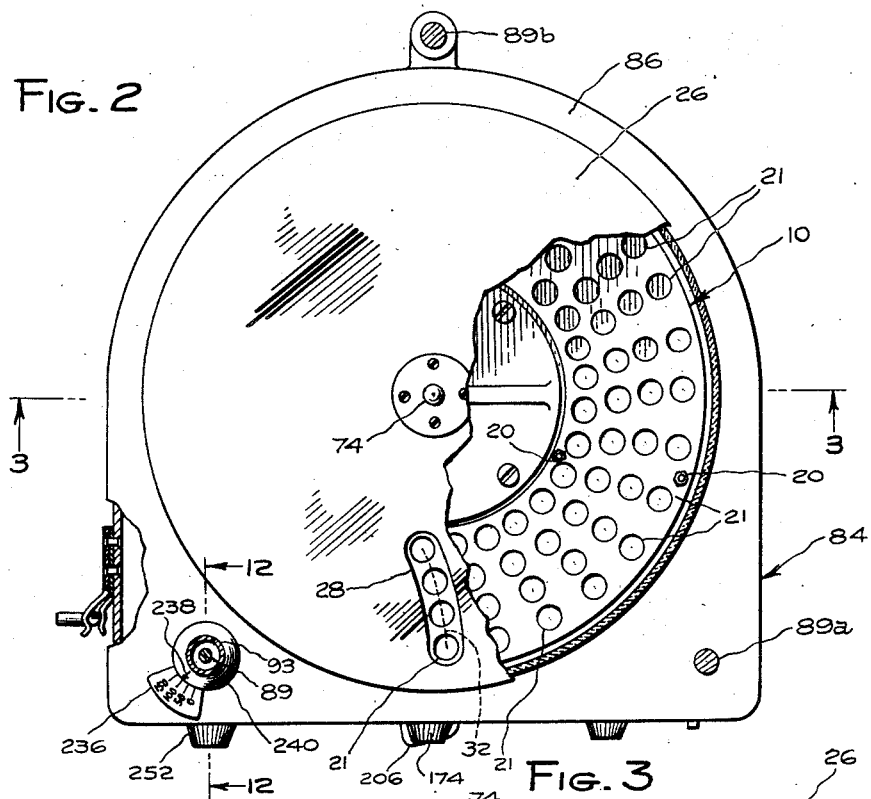
Fig. 2 is a plan view, partly in section on the line 2—2 of Fig. 1, with parts cut away for the purpose of illustration.
Figure 3:
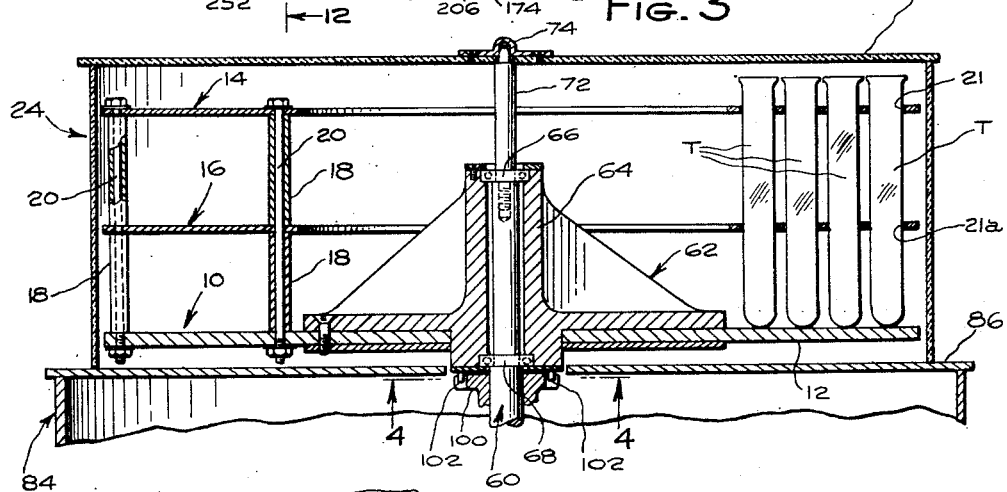
Fig. 3 is a vertical sectional view on the line 3—3 of Fig. 2.

In the use to which the apparatus is presently being put, accurately measured uniform quantities of liquid are collected in a multiplicity of test tubes or other suitable receptacles or containers which, in the form of the apparatus herein disclosed, are carried by a rotatable rack 10 (Figs. 2 and 3). The liquid receiving receptacles or containers, a few of which are indicated at T in Fig. 3, are disposed in each of a plurality of laterally related rows, here shown as circular rows, the rack or container-supporting means 10 being circular. The containers rest on the bottom 12 of the rack and are held removably in upright position and in uniform circumferentially spaced relation in each row by the horizontal plates 14 and 16 which are secured in vertically spaced relation, by the spacing sleeves 18 and companion bolts 20. For this purpose plate 14 is provided with a plurality of circumferentially spaced openings 21 for the outermost row of containers, and similar openings are provided in plate 14 for each of the other rows, there being four such rows, in the apparatus as now constructed, as shown in Fig. 2. The lower plate 16 is similarly provided with four circular rows of circumferentially spaced openings as indicated at 21a, in Fig. 3, the openings in each row being in registry with the openings in the respective rows of plate 14.

Rack 10 is mounted for rotation about a vertical axis, as hereinafter more particularly described, and is moved intermittently, i. e., stepwise, for presenting each of the containers of each row successively at the liquid-receiving station at which the material-supply device and control unit 22 (Fig. 1) is mounted. It will be noted that the rack is disposed within a stationary housing 24 provided with a removable cover 26 and that the latter has a slot or opening 28 to allow the passage of the liquid from the outlet 25 of unit 22 into the receptacle T at the liquid receiving station. The supply device and control unit 22 is mounted for controlled step movement laterally of the rows of containers into positions in which the liquid outlet 25 of said control unit registers with the containers in each of the laterally related rows, respectively, of the rack. More particularly, the control unit 22 may be first positioned in registry with the outermost row of containers so as to supply liquid to each of the containers in said outermost row during one revolution of rack 10, after which the control unit 22 is moved in succession, inwardly toward the center of the rack, to the other rows for supplying liquid to each of the containers of each of said other rows during the next three revolutions of the rack.

The supply and control unit 22 is mounted on a vertical post 30 and turns with the latter about the vertical axis of said post in moving from one row of containers or receptacles T to each of said other rows. Accordingly, the outlet 25 of the control unit 22 moves in an arcuate path in the movement of the control unit from one row of receptacles to another. In this connection, it will be noted that opening 28 is arcuately shaped and has its center of curvature at the axis of post 30, and further it will be observed that as clearly shown in Fig. 2 the laterally aligned openings in plates 14 and 16 are disposed along the arc of a circle which has its center at the axis of post 30 when each set of laterally related openings of the several rows are at the liquid-receiving station as indicated in dotted lines at 32 in Fig. 2.

As illustrated in Fig. 1, the liquid which is supplied to the receptacles on the rack 10 is provided in a supply container 34 having an adjustable valve 36 at its outlet from which the liquid flows through a tube 38 of the column for treatment by a substance contained therein, depending upon the process for which the apparatus is to be used. From the outlet of the tube 38 the liquid flows intermittently, i. e., drop by drop, the drops being of the same volumetric size, into the funnel 40 carried by the control unit 22. The drops of liquid pass through a transparent glass tube 42 which forms a liquid passage in the control unit 22 (Fig. 15) located between a photoelectric cell 44 and a companion exciter lamp 46 mounted within the casing 48 of said control unit. As each drop of liquid passes across the path of light from the lamp 46 to the photoelectric cell 44, a relay, subsequently described, is operable under the control of said photoelectric cell and mechanism, subsequently described, operates under the control of said relay, after the predetermined drops of liquid are supplied to the test tube at the liquid receiving station, to turn the rack 10 one step whereby to bring the next test tube into position at the liquid receiving station. More particularly, the passage of each drop of liquid between the photoelectric cell and the exciter lamp 46 interrupts the light to the cell and initiates an electric impulse which is transmitted to a suitable impulse counter mechanism which is adjustable and may be pre-set so as to automatically control the intermittent movement of rack 10. Supply container 34 and column tube 38 move as a unit with control unit 22. For this purpose container 34 and tube 38 are carried by supports 48 and 50, respectively, which are releasably secured to post 30 in any suitable way as by clamping screws 52 and 54, respectively.

Rack 10 is turned intermittently in order to carry the liquid-receiving receptacles T successively to the liquid-receiving station and allow sufficient time of each receptacle at said station to receive a predetermined quantity or charge of liquid. After all of the receptacles in one row are supplied with the predetermined quantities of liquid, the control unit is moved automatically to the next row. In the apparatus which has already been constructed and operated pursuant to the present invention, there is provision for 50 test tubes in each of the four rows, or a total of 200 test tubes. As will hereinafter be explained, the apparatus may be set so as to supply a predetermined quantity of liquid to all of the 200 test tubes or to any predetermined smaller number of test tubes, according to requirements.

Rack 10 is mounted for turning movement on a stationary vertical shaft 60 (Figs. 3 and 8). Said rack is secured to a casting 62 having a hub 64. Bearings 66 and 68 are provided for anti-friction purposes between the rack and the shaft 60. As shown in Fig. 8 casting 62 which carries the rack is supported on the horizontal shoulder 70 of shaft 60. When the cover 26 is removed, the rack may be removed from the shaft. Thus, it will be noted that the rack is conveniently portable. A pin 72 is threaded into the upper end of shaft 60, as shown in Fig. 3, and cover 26 is provided with a central recessed part 74 which engages the upper end of said pin for centering the cover on the rack housing 24. Any suitable means (not shown) may be provided on the cover and on the housing so as to position the cover with the opening 28 thereof in register with the liquid outlet 25 of the control unit 22.

Stationary shaft 60 is mounted in upright position in a frame 76 (Figs. 8 and 9) and more particularly in a fixed cylindrical part 78 of said frame. The frame is rigidly secured in any suitable way, as by screws 80, to the bottom 82 of the base 84 which as here shown is in the form of a housing for the mechanism mounted in said base. The top 86 of said housing provides a support for the rack housing 24. As shown in Fig. 3 housing 24 is preferably made of transparent material so that the receptacles and the contents thereof may be inspected without requiring removal of the rack from its housing. The front of the base-housing 84 is normally closed by a removable wall member 88 which provides a control panel for the various manually operable control devices provided in the apparatus as hereinafter described.

Stationary rods 89a and 89b are secured at their lower ends to base 84 and are connected at their upper ends by a triangular frame member 90. Post 20 on which device 22 is mounted is formed in sections and comprises as one section thereof an upper tube or sleeve 91 having a rotary bearing 92 at a corner of frame member 90 the lower end portion of tube 91 having unit 22 secured adjustably thereto in any suitable way, as by set screw 91a. The other section of post 30 comprises a tube or sleeve 93 which has a rotary bearing 93a (Fig. 12) at the top of base 84 by which sleeve 93 is supported in upright position. The upper end portion of sleeve 93 projects into unit 22 and the latter is secured adjustably to said upper end portion in any suitable way as by pin 94 and the take-up nut 94a (Fig. 17). Pin 94 has an arcuate recess 94b which engages the upper end portion of sleeve 93. By threading nut 94a on pin 94 against the adjacent portion of unit 22, the arcuate portion 94b or pin 94 is clamped against the upper end portion of sleeve 93 whereby to secure unit 22 to said sleeve. It will be noted that sleeves 91 and 93 are of larger diameter than rod 89 so that post 30 may turn around its longitudinal axis around said stationary rod without engaging the latter. The upper end 93b of sleeve 93 is spaced from the lower end 91b of sleeve 91 and is open within the casing of unit 22. An opening 93c is provided in the side of sleeve 93 at the lower part thereof within the housing of base 84. Said opening 93c and the open upper end of sleeve 93 provide for the electric wires (not shown) to photo-electric cell 44 and lamp 46, as well as to other electrical devices in unit 22. It will be understood that the electric wires extend through sleeve 93 in the space between the latter and rod 89 and have their terminals in unit 22 and in the housing of base 84.

Figure 4:
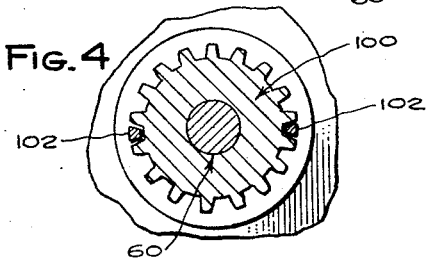
Fig. 4 is a sectional view on the line 4—4 of Fig. 3.

The mechanism for turning rack 10 comprises the gear unit 98 which is mounted for sliding movement longitudinally of stationary shaft 60 and for rotation about the axis of said shaft. Said gear unit comprises a gear 100 which is releasably engageable with the teeth or projections 102 (Figs. 3, 4 and 8) fixed to the rack-carrying member 62. More particularly as here shown teeth 102 are fixed to a plate 104 which is rigidly fastened to rack-carrying part 62 as shown in Fig. 8. Teeth 102 are slidably engageable with the teeth of gear 100 axially of said gear in the grooves between said gear teeth but are not otherwise movable in relation to said gear teeth when said gear engages teeth 102. Gear unit 98 also includes a gear 106 which meshes with a driving gear 108 when gear 100 of said gear unit is in driving engagement with the teeth 102 of the rack-carrying member 62. Gear 108 is fixed to and rotated by a shaft 110 which is journaled for rotation in the parts 112 and 114 of frame 76. Said shaft 110 is provided with an actuating gear 116 driven by a worm 118 carried by a shaft 120 journaled for rotation in frame 76 (Figs. 8 and 9). A Geneva gear mechanism is provided for turning shaft 120 intermittently whereby to turn rack 10 one step at a time during the operation of the apparatus. The Geneva gear mechanism comprises the Geneva gear 122, which is fixed to shaft 120, and the cooperating gear device 124 of the Geneva gear movement, said cooperating Geneva gear device being fixed to a rotatable shaft 146 which is mounted for rotation in frame 76. It will be noted that, as usual, the cooperating gear device 124 of the Geneva gear movement includes a pin 148 which is engageable in the circumferentially spaced radial slots of the Geneva gear 122 for turning the latter intermittently during the rotation of shaft 146. Shaft 146 is actuated by an electric motor M which has a driving connection with said shaft by the worm 150 rotated by the shaft of said motor and by the cooperating worm wheel or gear 152 fixed to shaft 146.

Switch-operating mechanisms here shown as cams 154 and 156 are fixed to and rotated by shaft 146 for momentarily closing normally open switches 158 and 160, respectively, which are mounted on brackets 162 and 164 carried by frame 76. Said switches are preferably of the micro-switch type, but may be of any other type, and each includes a pin 166 which is engaged by the cams 154 and 156, respectively, for momentarily closing the normally open contacts of the switches. These switches cooperate with other devices hereinafter described for controlling the operation of motor M. The arrangement and relation between the parts of the motor-operated mechanisms is such that shaft 146 makes only one revolution during each operation of the motor under the control of switches 158 and 160 and the associated control devices hereinafter to be described in detail. It will be understood that when gear 100 is in driving engagement with rack 10, the operation of motor M is such as to turn the rack precisely the angular distance required to bring the liquid-receiving receptacles T in succession, in each row, to the liquid-receiving station at which control unit 22 is positioned, so that during the successive movements of the rack all of the liquid-receiving receptacles of each row are presented at the liquid-receiving station, in succession, and are there held for a sufficient length of time to receive therein a predetermined, accurately measured quantity of liquid.

Provision is made for moving gear unit 98 longitudinally of shaft 60 for engaging gears 100 and 106 with rack 10 and driving gear 108 respectively and for disengaging the gears of said unit from said rack and from said driving gear. For this purpose gear unit 98 includes a gear-shift sleeve 168 which is interposed between gears 100 and 106 in fixed relation thereto for operation by a gear-shift fork 170 which is mounted for pivotal movement in frame 76 by the pivot pins 172. Gear-shift fork 170 is operated by a rotary control knob 174 disposed at the front of control panel 88. Said knob is fixed to a rotary shaft 176 journaled in a bearing portion 178 of frame 76. A crank 180 is fixed to shaft 176 and is provided with a crank pin 182 which engages a link 184, there being a universal or ball and socket joint 186 between said crank pin and link. The upper end of link 184 is connected to a rod 188 which is fixed to the cross arm of gear shift fork 170, there being a universal or ball and socket joint 190 between said link and said rod.

Indexing mechanisms are provided in the apparatus for predtermining the number of receptacles, up to the capacity of the apparatus, to be supplied with liquid during the operation of the apparatus. The indexing mechanisms include the gears 192, 194, 196, and 198 and associated devices which will be referred to as the description proceeds. Gear 192 is fixed to a shaft 200 which is journaled for rotation in the bearing portions 202 and 204 of frame 76. Gear 192 meshes with gear 194 and the latter meshes with gear 196. Each of said gears 192, 194, 196 has 50 teeth, corresponding to the number of liquid receiving receptacles in each receptacle-row of rack 10, so that one complete revolution of the rack is accompanied by one complete revolution of each of said gears. Shaft 200 may be turned by a control or indexing knob 206 disposed at the front of panel 88. Said control knob is fixed to shaft 208 journaled for turning movement in part 210 of frame 76. Said shaft 208 is provided with bevel gear 212, and a companion bevel gear 214 is fixed to shaft 200 whereby turning of shaft 208 by knob 206 is effective to turn shaft 200. A gear 216 is fixed to shaft 200 for turning the latter, said gear 216 being at all times in mesh with gear 106 of gear unit 98. It will be understood that when gear 106 is in mesh with gear 108 the latter is operatively connected to shaft 200 for turning the latter and that this turning movement of shaft 200 by gear 108 through gears 106 and 216, occurs during each partial rotary or step movement of the rack 10, by gear 108 operating through gear 100 and the companion teeth 102 of the rack.

Gear 198 is arranged to be operatively connected to sleeve 93 of post 30 for turning the latter a predetermined angular distance whereby to position the control unit 22, and more particularly the liquid outlet 25 of the latter, in registry with the next row of receptacles on the rack after all of the receptacles of the preceding row are supplied with liquid, assuming that more than 50 receptacles are to be supplied with liquid from the supply receptacle 34. Provision is made for turning gear 198 step-wise a predetermined distance under the control of gear 196 and for holding said gear 198 stationary except when operated by gear 196. For this purpose a gear element 218 is mounted in fixed relation to gear 196, for operation by the latter, said gear member 218 being securely but releasably fastened to plate 220 which is in fixed relation to and rotates with gear 196. As shown in Fig. 5 gear element 218 has only one tooth-receiving groove indicated at 222 in registry with a radial groove 223 which is open at the peripheral edge 221a of plate 221. A gear mechanism 224 shown more clearly in Figs. 5, 7A, 7 and 12 is arranged in position to be actuated by gear member 218 for turning gear 198. The gear mechanism 224 comprises, in fixed relation, a gear 226 having three teeth and a gear 228 having six teeth. These gears may be made in one piece and are fixed on a shaft 230 carried by the fixed bracket plates 232 and 234. It will be observed that gear 228 is at all times in mesh with gear 198 but that gear 226 and gear member 218 are in such relation that during one complete rotation of gear 196 gear member 218 engages only one tooth of gear 228 and then disengages said gear completely, so that upon each operation of gear member 218, pursuant to rotation of the gear 196, gear 198 is rotated a predetermined angular distance for turning post 30 the same angular distance. Gear 226 in conjunction with plate 220 prevents gear 198 from turning except when gear 228 is actuated by member 218 after gear 196 is turned a predetermined distance depending upon the setting of the indexing gears by operation of indexing knob 206. As shown in Fig. 7A, gear 226 is disposed with two teeth thereof in face contact with the circular edge 221a of plate 221 at circumferentially spaced points, whereby gear device 224 is prevented from turning except when one of said edge-contacting teeth of gear 226 is in position at the entrance to groove 223 pursuant to the predetermined angular movement of plate 220 by gear 196. In the relative position of plate 220 and gear 226 at which one of the teeth of the latter can enter groove 223, gear 228 is engaged by gear member 218 and during the step-movement of gear 196 which then occurs gear member 218 turns gear 228 and thereby turns gear 198 one step through an angular distance determined by the gear ratio of gears 198 and 228. During this actuation of gear 228, gear 226 is correspondingly turned so that two teeth thereof are again disposed in contact with the circular edge of plate 220 whereby to prevent gears 228 and 198 from turning until plate 220 makes a complete revolution. It will be noted that gears 226 and 228 are of equal diameter so that an angular movement of gear 228 by gear member 218 always brings two teeth of gear 226 into contact with the edge 221a of plate 220 at points spaced circumferentially of the latter so that gear 226 cannot turn in either direction and hence prevents gear 198 from turning in either direction. Accordingly when gear 198 is operatively connected to sleeve 93 of post 30 of control unit 22, the latter is held in set position with respect to the receptacle-row of rack 10 and, in the operation of the apparatus, is prevented from moving from said position until gear 198 is actuated as just described. The mechanism comprising plate 220, member 218 and cooperating gear mechanisms 226, 228 operate as a lost motion mechanism so that the indexing gears may be turned up to one revolution without operating gear 198 thus providing for a complete revolution of rack 10, if required, according to the number of receptacles to be charged, before gear 198 is operated to turn post 30 for moving unit 22 from its position over one receptacle row to a position over the next receptacle row or to a position for interrupting the operation of the apparatus. The mechanism just referred to as operating as a lost motion mechanism or device also operates as described above to hold the control unit or material supply device 22 in its set position and prevents movement thereof until gear 196 has completed its predetermined movement in response to the number of step movements of rack 10 predetermined by setting of the indexing mechanism by knob 206 on the control panel.

Provision is made for operatively connecting gear 198 to post 30 and for disengaging said operative connection so that said post and the control unit 22 carried thereby may be turned, free of gear 198, for manually positioning the control unit 22 at the desired row of receptacles. More particularly, it will be understood that when the receptacles in all of the rows are to be supplied with liquid, unit 22 is positioned so that its liquid outlet 25 is in registry with the outermost receptacle-row of the rack. In order accurately to determine the position of the outlet 25 of the unit 22 in relation to any particular row of receptacles carried by the rack, depending upon the number of receptacles which are to be supplied with liquid, a stationary dial plate 236 is provided on the cover 86 of the mechanism housing or base 84 and a pointer 238 is provided on the part 240 which turns with the post 30. Part 240 is a conical member which is secured to sleeve 93 in any suitable way as by a set screw 241. As will be explained subsequently, the setting of the post so that pointer 2386 indicates a corresponding reading on dial 236 and the setting of knob 206 in relation to the dial 242 on front panel 88 determine the number of receptacles which are to be supplied with liquid and also determine the time of termination of the operation of the apparatus following the initiation of said operation and the setting of the liquid measuring or timing device as later explained.

As indicated above, gear 198 is disengaged from its driving relation with post 30 to facilitate the turning of said post for positioning the control unit 22 manually in relation to the receptacle rows on the rack 10. After unit 22 is positioned, the driving relation between gear 198 and the post is restored. For thus engaging and disengaging gear 198 from its driving connection with post 30, the mechanism which will now be described is provided. This mechanism includes the unit 244 (Fig. 12) which carries gear 198 at its lower end and a gear 246 at its upper end. Said gear unit 244 is mounted for rotation coaxially with sleeve 93 of post 30 and for that purpose is provided with a rotary bearing 247 at its lower end whereby it is journalled for rotation in the support 247a fixed to base 82. The upper part of gear unit 244 has an inner cylindrical surface 244a in which the lower end portion of sleeve 93 is received in movable contact therewith. The gear 246 of unit 244, which is stationary longitudinally of rod 89, constitutes a clutch member which is releasably engageable by a movable clutch member 248 which is splined to sleeve 93 for movement longitudinally thereof and for rotation therewith. Clutch member 248 has a plurality of circumferentially spaced end projections or prongs 250 arranged to engage clutch member 248 in the spaces or grooves between the teeth of the latter. Prongs 250 have a sliding fit in the grooves between the teeth of gear 246 axially of the latter but do not otherwise move in relation to said gear teeth when the clutch members are engaged.

A knob 252 is provided at the front of control panel 88 for operating a mechanism for moving clutch 248 into and out of engagement with clutch gear 246. This last-mentioned mechanism comprises a fork 254 which engages a collar 256 (Fig. 14) with respect to which clutch 248 may turn about the axis of post 30. Said fork is pivoted at one end thereof to a stationary part of the base as indicated at 258 in Fig. 12, and the opposite end of said fork is engaged by a crank pin 260 carried by the crank 262 which is fixed to and turnable by the shaft 264 to which knob 252 is secured. It will be understood that by turning the knob 252 so as to lower the crank pin 260, the weight of clutch 248 is sufficient to cause said clutch to move toward gear 246 for engagement of prongs 250 in the grooves of said gear, thus establishing a driving engagement between gear 198 and sleeve 93 of the post.

A cam 266 is fixed to sleeve 93 so as to turn therewith whereby to open a normally closed switch 268 for interrupting the main electric circuit, independently of all other circuit controls, and thus to terminate the operation of the apparatus when the post 30 has been turned a predetermined distance in counterclockwise direction (as viewed from the top in Fig. 1) from its initially set position, after the predetermined number of receptacles are supplied with liquid pursuant to the setting of the post in relation to dial 236 and the setting of knob 206 in relation to dial 242. As shown in Fig. 13 cam 266 is arranged to engage a spring follower 270 which engages an actuating member of switch 268 for moving the movable contact member of the switch to its open position. Switch 268 is preferably of the micro-switch type, although it can be any suitable normally closed stop switch. A tension spring 274 is connected at one end thereof to a part 276 fixed to the base 84 and at its opposite end to an eye 278 which projects from the collar 280 which is in fixed relation to the post. Spring 274 tends to turn the post and the clutch 248 mounted thereon whereby to prevent lost motion between the clutch prongs 250 and the companion teeth of gear 246 when the clutch is engaged with said gear.

Provision is made in the apparatus for preventing the flow of liquid into any receptacle T at the end of the operation of the apparatus or in the event that the exciter lamp 46 of the photoelectric cell burns out or is not illuminated. For this purpose the control unit is provided with a liquid intercepting device 282 which is carried by the control unit 22 in position at the bottom thereof. Said intercepting device comprises a tube 284 mounted in a bracket 286 which is secured to a shaft 288. A normally energized solenoid 290 is arranged in the control circuit of the apparatus, as will be subsequently described in further detail with reference to the circuit diagram (Fig. 18), so that during the normal operation of the apparatus and before the termination of said operation said solenoid is energized and the solenoid core 292 which is connected by member 293 to the crank arm 294 of shaft 288 holds said shaft in a position in which the liquid-intercepting device 282 is in its retracted position out of registry with the liqud outlet 25, as shown in Fig. 17, so that the liquid may pass to the test tube or other receptacle in registry with said outlet. In the event, however, that the solenoid 290 is de-energized, at the end of the operation of the apparatus, or due to a defective control condition, spring 296 is effective to turn shaft 288 for moving the liquid intercepting device 282 so that the cup 298 at the liquid-receiving end of said device is brought into registry with the outlet 25 for thus intercepting the flow of liquid from said outlet to the receptacle T on the rack and for transmitting the intercepted liquid to a suitable collection receptacle indicated at R in Fig. 1. The tube 284 of the liquid intercepting device is connected by a rubber or other flexible tube 300 to an outlet fitting 302 releasably mounted on the vertical wall of the housing-base 84 in any suitable way as by a releasable spring clamp 304.

When solenoid 290 is de-energized and it is desired to move the liquid-intercepting device 282 to its retracted position (Fig. 17), a knob 306 may be turned for operating cam 308 to move part 293 for turning shaft 288. The control unit 22 is provided with viewing openings 310 at both sides thereof at opposite sides of the liquid passage 42, which is transparent, so that the passage of liquid through the control unit may be observed. Also, at opposite sides of the casing of the control unit there are perforated plates 312, and at the top of the casing there is a ventillating cap 314 as an off take for the heat of the exciter lamp 46. It will be noted that the funnel 40 is removably secured in position on the control unit by an externally threaded nut 316 which engages a split or compressible bushing 318 which grips the stem of the funnel, providing an adjustable securing device for funnels which may have stems of different diameters.

Summarizing the operation of the apparatus as thus far specifically described, it will be observed that if liquid is to be supplied to not more than 50 receptacles, post 30 is adjusted to position the control unit 22 with its liquid outlet in registry with the innermost receptacle row of rack 10, as determined by the position of the pointer 238 in relation to dial 236. This adjustment of post 30 is performed while clutch 248 is disengaged from gear 246 as indicated by the position of knob 252 when its pointer is at the legend "disengaged" on the control panel 88. After the post is adjusted knob 252 is turned to the "engaged" position, indicated on the control panel 88, for engaging clutch 248 with the driving gear 246. Post 30 is held in this adjusted position by the engagement of gear 198 with gear 228 of gear unit 224 in conjunction with plate 220 until gear member 218 engages one of the teeth of gear 226 during the turning of indexing gear 196. The number of receptacles, in the innnermost row, which are to be supplied with liquid is determined by operation of indexing knob 206 which is turned for operating indexing gear 192 while the rack is disengaged from gear 100 of shift-gear unit 98 and while gear 106 of said unit is disengaged from driving gear 108. It will be understood that for determining the number of receptacles of any particular row which are to be filled with liquid, knob 206 is turned in such direction as to turn gear 192 in a direction opposite to that in which said gear is turned when gear 106 is operated by the driving gear 108 at which times the rack is turned in the same direction by the engagement of gear 100 with said rack. If more than 50 and not more than 100 receptacles are to be supplied with liquid, post 30 is adjusted so that the liquid outlet 25 of the control unit is positioned in registry with the second innermost receptacle-row of the rack, and knob 206 is adjusted to position the indexing gears for determining the number of receptacles in that particular row which are to be supplied with liquid. When the post 30 and knob 206 are adjusted for the particular number of receptacles, the post remains stationary until the selected number of receptacles in the second innermost row are supplied with liquid, whereupon post 30 is turned automatically by the operation of gear 218 on gear member 226 to turn the post so as to position the outlet 25 of the control unit into registry with the innermost receptacle row of the rack. It will be obvious that if more than 100 and not more than 150 receptacles are to be supplied with liquid post 30 is adjusted so that its liquid outlet is positioned in registry with the second outermost receptacle row of the rack and that knob 206 is adjusted for determining the exact number of receptacles within this range; and likewise it is obvious that if more than 150 receptacles are to be supplied with liquid post 30 is adjusted so that the liquid outlet 25 of the control unit is in registry with the outermost receptacle row of the rack and knob 206 is adjusted for determining the exact number of receptacles, between 150 and 200, to be supplied with liquid.

It is apparent from the above description that when the rate of flow of liquid through the control unit is adjusted so that said rate of flow is uniformly constant, the quantity of liquid which is supplied to each receptacle is determined by the length of time during which that particular receptacle is held stationary in position under the liquid outlet 25 of the control unit and this length of time is the same as the duration of the period during which the rack is stationary, that is, the length of time between two successive operations of motor M. This length of time may be predetermined by any suitable timing device but in the present instance in view of the drop-by-drop supply of liquid, the timing device is of the type which operates as a drop counter. This timing device indicated at 320 is mounted on control panel 88 and has a suitably calibrated dial and a time-adjusting knob 322. The timing device or counter may be of any suitable type, and since it is not in itself part of the present invention it is not herein described specifically, but certain parts thereof are hereinafter referred to in explaining the operation of the apparatus. The counter or timing device utilized in the apparatus as actually constructed and operated is an instantaneous reset counter of the type described in U. S. Patent No. 2,329,447 and was supplied by Eagle Signal Corporation, Moline, Illinois. When a start switch, in this case switch 158 (Figs. 9 and 18), is closed, a clutch coil, i. e., a coil of an electro-magnetically operated clutch, is engaged and impulses transmitted to a count or ratchet-operating coil of an electro-magnet are effective to operate the ratchet, and when the clutch coil is de-energized, the counter is automatically reset to its starting position. The count coil and the ratchet operated thereby take the place of the synchronous or clock motor 22 of said patent for operating the timer shaft 25 of said patent, and the switch connections in the circuit are modified as required, as indicated in Fig. 18, as will be readily apparent. The clutch coil and count coil and the switching connections are schematically shown in Fig. 18 and will be presently more particularly referred to in the description of the operation of the apparatus.

As shown in Fig. 18, the photo-electric cell 44 of control unit 22 is connected to the electronic tube 324, which as here shown is a 6SJ7 tube, in an electronic-relay circuit. This tube is biased so that it is normally non-conducting but becomes conducting under the control of photo-electric cell 44 each time a drop of liquid passes between said cell and the exciter lamp 46 and cuts off the light from said lamp to said cell. An electronic tube 326, here shown as a 6SN7 tube, has an electronic discharge system therein connected to the winding of magnetic relay 328 and operable under the control of tube 324. The section of tube 326 which is connected to relay 328 and tube 324 is indicated at A. This section is normally conducting and energizes the winding of relay 328 so that the contacts 330 and 332 of said relay are normally open. When a pulse is received by tube 324, section A of tube 326 becomes non-conducting and as a result the winding of relay 328 is deenergized and contacts 330 and 332 of said relay close so that a pulse is sent to the count or ratchet-operating coil 336 of the timing device 320. Power for the relay circuit is provided by the transformer secondary winding 338, the primary winding 340 of said transformer being connected to the supply lines L1 and L2 which receive alternating current from a suitable source. Tube 326 conducts current only during the positive half of the alternating current cycle, so that a pulsating current flows through the relay circuit. Accordingly a condenser 342 is provided to smooth the voltage across the winding of relay 328 so as to prevent it from following the frequency of the current through the tube. The section B of tube 326 constitutes a half wave rectifier for the current supplied by the transformer secondary winding 344. The sensitivity control provided by the adjustable resistance 346 is adjusted, by the knob 347 on control panel 88, so that the effect of the light from lamp 46 on photo-electric cell 44 causes the grid of tube 324 to be negative with respect to the cathode, whereby plate current through said tube is cut off as a result of this negative bias. The grid-cathode of section A of tube 326 is connected across the resistor 348 in the plate circuit of tube 324. The voltage drop across this resistor acts as a bias voltage to the grid of section A of tube 326, but since voltage across this resistor is normally zero the flow of plate current in section A of tube 326 takes place so that the winding of relay 328 is normally energized as hereinbefore indicated. When light on the photo-electric cell 44 is interrupted, upon the passage of a drop of liquid across the light beam from lamp 46 to said photo-electric cell, the negative bias on the grid of the tube 324 is decreased and the plate circuit of said tube conducts current whereby the voltage drop across resistor 348 produces a negative bias across the grid-cathode of section A of tube 326, interrupting the flow of current in the plate circuit of said tube and thus de-energizing relay 328 so that contacts 330, 332 close and complete a circuit through the count or ratchet operating coil 336 as hereinbefore stated. The condenser 350 across resistance 348 charges when tube 324 conducts current, and after said tube is cut off the charge across condenser 350 leaks off across resistor 348 and thereby maintains the grid of section A of tube 326 negatively biased and the circuit of the winding of relay 328 de-energized for a short period of time after light is restored to the photo-electric cell 44. This circuit provides a quick charge path and a slow discharge path for the condenser 350 and in this way a light interruption of short duration, when a drop of liquid passes between the photo-electric cell and the exciter lamp 46, is in effect prolonged for a sufficient length of time to enable the relay 328 to operate. The transformer secondary 352 provides a source of current for heating the filaments of tubes 324 and 326.

A step-down transformer 354 connected to supply lines L1 and L2 is provided for energizing the exciter lamp 46 and the winding of solenoid 290 which normally holds the liquid intercepting device 282 in its retracted position (Fig. 17) as described above.

Supply lines L1 and L2 are connected to a suitable source of 60-cycle alternating current through the main manually operable switch 356 which is mounted on the control panel 88. Said control panel is also provided with an electric receptacle or plug-in socket 358 to receive a plug terminal for supplying the operating current to the apparatus through said switch 356. The switch 268 which is normally closed but which is opened when post 30 turns to its end position at the completion of the operation of the apparatus, as described above with reference to Fig. 13, is also shown in Fig. 18.

Motor M is connected directly to line L1 by wire 360 and to line L2 through the switch 362 of the timing device or counter 320. Switch 362 has a stationary contact 364 which is connected to the motor by wire 366, and a companion movable contact 368 which is connected to line L2 by wire 370. Contact 368 is engaged with the companion contact 364 of switch 362 when the solenoid or clutch coil 372 of the timing device 320 is de-energized, and conversely, when said clutch coil is energized, the armature 374 which is then attracted by said clutch coil is operable to disengage contact 368 from contact 364 for opening switch 362, thus interrupting the supply of current to motor M. It will be noted that line L1 is connected to one terminal of clutch coil 372 by wire 376 and to one terminal of the count or ratchet-operating coil 336 by wire 376 and by wire 378. The other terminal of the clutch coil is connected to line L2 by wire 380 through switch 158, said switch and the companion switch 160 being connected to line L2 by the wire 382. The other terminal of the count or ratchet operating coil 336 is connected to the contact 330 of relay 28 by wire 384, and as pointed out above when contact 330 is engaged with contact 332 said other end of coil 336 is connected to line L2 for energizing said coil.

The timing device 320 includes a stationary contact 386 and a companion movable contact 388. These contacts are open when the clutch coil is de-energized and are closed when said clutch coil is energized, contact 388 being then moved to engage contact 386 by armature 374 of said clutch coil 372. It will be noted that contact 386 is connected to one terminal of the clutch coil and that movable contact 388 is connected to line L2 by wire 370 to complete a holding circuit for said clutch coil.

The operation of the apparatus will now be described with reference to Fig. 18, it being assumed that the post 30 has been set and knob 206 has been operated to actuate the indexing mechanism to determine the number of receptacles which are to be provided with liquid through the control unit 22 and that the knob 322 of the timing device or counter 320 has been set to determine the quantity of liquid to be supplied to each of said receptacles under the control of the photo-electric relay which is operable under the control of the photo-electric cell 44 in response to the movement of the drops of liquid from the funnel across the beam of light to said cell. When switch 356 is closed, motor M is connected across the lines L1 and L2 through switch 362 of the timing device 320 and operates to turn shaft 146. When shaft 146 has turned a short distance, start switch 158 is closed momentarily by cam 154 and completes the circuit through the clutch coil 372 so that said coil is energized and opens the switch 362, at the same time closing the contacts 386 and 388 providing a holding circuit for the clutch coil 372 independently of switch 158. Although switch 362 is opened when clutch coil 372 is thus energized, the motor continues to operate for a short time, since the circuit therethrough is held closed momentarily at the switch 158 closed by cam 156 which is set to close switch 160 shortly before switch 158 is actuated by cam 154 and then to open switch 160 a moment later, allowing one revolution of shaft 146 to take place. Motor M then stops and remains stationary until the count coil 336 has been energized a number of times corresponding to the setting of the knob 322 of the counter or timing device 320. After the predetermined number of pulses have been supplied to counter coil 336 under the control of relay 328, as described above, solenoid or clutch coil 372 is de-energized, contacts 386 and 388 being opened, and switch 362 is closed and the timer is automatically reset for the next operation. When contacts 386 and 388 are opened and clutch coil 372 is therefore de-energized switch 362 is closed, thus completing the circuit through motor M for operating shaft 146 through one revolution and thereby turning the rack one step by means of the Geneva gear movement described above with reference to Figs. 9 and 11. It will be understood that the time of each rack movement under the control of the photo-electric relay is less than the time between successive drops through outlet 25 of device 22, so that as soon as the last drop of one series passes into its receptacle, the next receptacle is in position to receive the first drop of the next series.

The operating cycle is repeated for each receptacle to be supplied with liquid, and it will be noted that during each movement of the rack under the control of count coil 336 in response to the operation of the impulse switch, i. e., contacts 330, 332 of the photo-electric relay, a corresponding movement is imparted to the indexing gear 192 and by the latter to the indexing gear 196 so that when the last receptacle has been supplied with liquid gear member 218 engages gear 224 for operating gear 198 whereby to turn the post 30 to its end position at which the normally closed switch 268 is opened, thus terminating the operation of the apparatus, even though switch 356 remains closed. It will be noted that when switch 268 is opened automatically at the end of the operation of the apparatus the winding of solenoid 280 is de-energized so that the liquid intercepting device 282 is moved by spring 296 to its liquid intercepting position at outlet 25 of the control unit, thus avoiding an oversupply of liquid to the last receptacle and also preventing overflow of said liquid in the apparatus. It will be apparent that when a drop-by-drop supply of liquid to the receptacles is not required or when a drop-by-drop count is not required or advantageous in timing the rest intervals of rack 10, any other suitable timing control of the operation of motor M may be provided; for example, the timing switch shown in the above mentioned patent operable by the synchronous or electric clock motor as described in said patent may be utilized for timing operations of motor M whereby to time the rest intervals of rack 10.

It will be observed that the provision for disengaging gear 198 from its driving connection with sleeve 93 of post 30 enables the latter to be moved for positioning unit 22 clear of the rack to a suitable position for convenience in adjusting the apparatus, including the drop-flow of the liquid, prior to setting the apparatus into operation for fraction collecting. It may be noted that the size of the liquid drop is determined by the outlet tip of funnel 40, said tip being so ground as to accurately pass a drop of a predetermined size. It will be observed that the condenser lens 389 (Fig. 15) focusses the light from lamp 46 on the drop as the latter passes across the path of light from said lamp to cell 44.

It will be observed that the apparatus of the present invention is operable to supply an accurately measured quantity of liquid to each of a pre-determined large number of receptacles, without requiring the attention or presence of an attendant. Thus, for example once the operation of the apparatus has been initiated, it may be left operating, overnight if necessary, until all of the selected number of receptacles are supplied with liquid, at which time the operation is automatically terminated.

Various features of the invention disclosed herein are now claimed in my divisional application Serial Number 218,187, filed March 29, 1951, and assigned to the assignee of this application.

Having thus described my invention, what I claim and desire to secure by Letters Patent, is:

1. Apparatus of the character described, comprising a movable device having a material-supply passage, means for supporting a plurality of receptacles in a plurality of laterally related rows, means for moving said supporting means in relation to the outlet of said passage for presenting the receptacles in succession at a position to be supplied with material issuing from said outlet and means including a lost motion mechanism operable automatically in response to a predetermined movement of said supporting means for moving said movable device laterally of said receptacle rows, whereby to position said device in material-supplying relation to the receptacles of one of said rows following the supply of material to the receptacles of another of said rows.

2. Apparatus of the character described, comprising a movable device having a material-supply passage, means for supporting a plurality of receptacles in a plurality of laterally related rows, means for moving said supporting means in relation to the outlet of said passage for presenting the receptacles in succession at a position to be supplied with material issuing from said outlet and means including a lost motion mechanism operable automatically in response to a predetermined movement of said supporting means for moving said movable device laterally of said receptacle rows, whereby to position said device in material-supplying relation to the receptacles of one of said rows following the supply of material to the receptacles of another of said rows, said lost motion mechanism including means to prevent movement of said movable device by said other moving means except in response to a predetermined movement of said supporting means.

3. Apparatus of the character described, comprising a movable device having a material-supply passage, means for supporting a plurality of receptacles in a plurality of laterally related rows, means for moving said supporting means in relation to the outlet of said passage for presenting the receptacles in succession at a position to be supplied with material issuing from said outlet and means including a lost motion mechanism operable automatically in response to a predetermined movement of said supporting means for moving said movable device laterally of said receptacle rows, whereby to position said device in material-supplying relation to the receptacles of one of said rows following the supply of material to the receptacles of another of said rows, said lost motion mechanism including means to prevent movement of said movable device by said other moving means except in response to a predetermined movement of said supporting means, said mechanism comprising a rotary member having a circular edge and a radial slot having an end thereof open at said edge, a gear member carried by said circular member at said slot, and a second gear member mounted for rotation about an axis laterally of the axes of said rotary member and having only three equi-spaced teeth two of which slidably engage said circular edge at circumferentially spaced points on the latter whereby turning of said second gear member is prevented except when one of said two teeth is at said open end of said slot.

4. Apparatus of the character described, comprising movable carrier means for supporting a plurality of receptacles in a row extending in the direction of movement of said carrier means, means for mounting a material-supply device in position at a receptacle-charging station, means for moving said carrier means step by step to carry said receptacles in succession to said station to receive a charge of material from said supply device, a motor for actuating said moving means, said moving means being releasably connectable in operating relation to said carrier means, indexing means operatively connected to said moving means to predetermine the number of step by step movements of said carrier means by said moving means, and timing means for controlling the operations of said motor whereby to predetermine the duration of rest intervals of said carrier means between the successive step movements thereof.

5. Apparatus of the character described, comprising movable carrier means for supporting a plurality of receptacles in a row extending in the direction of movement of said carrier means, means for mounting a material-supply device in position at a receptacle-charging station, means for moving said carrier means step by step to carry said receptacles in succession to said station to receive a charge of material from said supply device, a motor for actuating said moving means, said moving means being releasably connectable in operating relation to said carrier means, indexing means operatively connected to said moving means to predetermine the number of step by step movements of said carrier means by said moving means, and timing means for controlling the operations of said motor whereby to predetermine the duration of rest intervals of said carrier means between the successive step movements thereof, and means operable by said indexing means, pursuant to a predetermined number of step movements of said supporting means, to terminate the operations of said motor.

6. Apparatus of the character described, comprising movable carrier means for supporting a plurality of receptacles in a row extending in the direction of movement of said carrier means, means for mounting a material-supply device in position at a receptacle-charging station, means for moving said carrier means step by step to carry said receptacles in succession to said station to receive a charge of material from said supply device, a motor for actuating said moving means, indexing gear means operatively connected to said moving means to predetermine the number of step by step movements of said carrier means by said moving means, and timing means for controlling the operations of said motor whereby to predetermine the duration of rest intervals of said carrier means between the successive step movements thereof, and switching means operable in response to a predetermined number of step movements of said supporting means to terminate the operations of said motor.

7. Apparatus of the character described, comprising movable carrier means for supporting a plurality of receptacles in a row extending in the direction of movement of said carrier means, means for mounting a material-supply device in position at a receptacle-charging station, means for moving said carrier means step by step to carry said receptacles in succession to said station to receive a charge of material from said supply device, a motor for actuating said moving means, indexing means operatively connected to said moving means to predetermine the number of step by step movements of said carrier means by said moving means, and timing means for controlling the operations of said motor whereby to predetermine the duration of rest intervals of said carrier means between the successive step movements thereof, means operable in response to a predetermined number of step movements of said carrier means to terminate the operation of said motor, and means operable upon a predetermined number of step movements of said carrier means for cutting off the supply of material to said receptacles.

8. Apparatus of the character described, comprising movable carrier means for supporting a plurality of receptacles in a row extending in the direction of movement of said carrier means, means for mounting a material-supply device in position at a receptacle-charging station, means for moving said carrier means step by step to carry said receptacles in succession to said station to receive a charge of material from said supply device, indexing mechanism operatively connected to said moving means to predetermine the number of step by step movements of said carrier means, a motor for actuating said indexing means and said moving means, switching means for controlling the circuit of said motor, and timing means operable in conjunction with said switching means for controlling the operations of said motor whereby to predetermine the duration of rest intervals of said supporting means between the successive step movements thereof.

9. Apparatus of the character described, comprising a movable device having a material supply passage, means for supporting a plurality of receptacles in a plurality of laterally related rows, means for moving said supporting means in relation to the outlet of said passage for presenting the receptacles in succession at a position to be supplied with material issuing from said outlet, means operable automatically in response to a predetermined movement of said supporting means for moving said movable device laterally of said receptacle rows, whereby to position said device in material-supplying relation to the receptacles of one of said rows following the supply of material to the receptacles of another of said rows, and indexing means associated with said first mentioned moving means and with said other moving means for predetermining the extent of movement of said container supporting means required before said other moving means is actuated, said indexing means comprising a train of gears, manually operable means for turning said gears for setting said indexing means, and means operatively connecting said gears for turning movement in timed relation to the movement of said container supporting means.

10. Apparatus of the character described comprising container-supporting means mounted for rotation about a vertical axis and constructed and arranged to carry a plurality of containers in each of a plurality of radially related circular rows, means for intermittently turning said container-supporting means for presenting said containers in succession at a material-receiving station, means for mounting material-supply means at said station to supply the material successively to said containers of one of said rows, said supply means being movable from a position above said one of the rows to another position above another of said rows, and means including a gear mechanism actuated by said moving means and operatively connected to said supply means for moving the latter from said first mentioned position thereof to said other position thereof after a predetermined number of movements of said container-supporting means.

11. Apparatus of the character described comprising container-supporting means mounted for rotation about a vertical axis and constructed and arranged to carry a plurality of containers in each of a plurality of radially related circular rows, means for intermittently turning said container-supporting means for presenting said containers in succession at a material-receiving station, means for mounting material-supply means at said station to supply the material successively to said containers of one of said rows, said supply means being movable from a position above said one of the rows to another position above another of said rows, means operated by said moving means for moving said supply means from said first mentioned position thereof to said other position thereof after a predetermined number of movements of said container-supporting means, said first mentioned moving means including an electric motor, a photo-electric relay controlled by the passage of said material for controlling the closing of the circuit of the motor, and switching means operable under the control of said motor for interrupting said circuit.

12. Apparatus of the character described comprising a movable control device carrying a lamp, a companion photo-electric cell, and a vertical passage across the path of light from said lamp to said cell, container-supporting means mounted for movement in relation to the outlet of said passage and constructed and arranged to carry a plurality of containers in each of a plurality of laterally related rows extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a motor operable under the control of said relay in response to the passage of a substance through said passage for moving said container-supporting means intermittently to present said containers of each row in succession in position to receive a quantity of liquid from said outlet, means for moving said control device from said one position thereof to said other position thereof, and means operable under the control of said first mentioned moving means to actuate said last mentioned moving means for moving said control device to said other position thereof after a predetermined number of movements of said container-supporting means.

13. Apparatus of the character described comprising a movable control device carrying a lamp, a companion photo-electric cell, and a vertical passage across the path of light from said lamp to said cell, container-supporting means mounted for movement in relation to the outlet of said passage and constructed and arranged to carry a plurality of containers in each of a plurality of laterally related rows extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a motor operable under the control of said relay in response to the passage of a substance through said passage for moving said container-supporting means intermittently to present said containers of each row in succession in position to receive a quantity of liquid from said outlet, means for moving said control device from said one position thereof to said other position thereof, means operable under the control of said first mentioned moving means to actuate said last mentioned moving means for moving said control device to said other position thereof after a predetermined number of movements of said container-supporting means, and means operable in response to a predetermined number of movements of said container-supporting means to discontinue the operation of said moving means therefor.

14. Apparatus of the character described comprising a movable control device carrying a lamp, a companion photo-electric cell, and a vertical passage across the path of light from said lamp to said cell, container-supporting means mounted for movement in relation to the outlet of said passage and constructed and arranged to carry a plurality of containers in each of a plurality of laterally related rows extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a motor operable under the control of said relay in response to the passage of a substance through said passage for moving said container-supporting means intermittently to present said containers of each row in succession in position to receive a quantity of liquid from said outlet, means for moving said control device from said one position thereof to said other position thereof, and means operable under the control of said first mentioned moving means to actuate said last mentioned moving means for moving said control device to said other position thereof after a predetermined number of movements of said container-supporting means, substance-receiving means movable from a retracted position to a projected position for intercepting the substance normally passing from said outlet to said containers, and means operable in response to a predetermined number of movements of said container-supporting means to move said substance-receiving means from said retracted position thereof to said projected position.

15. Apparatus of the character described comprising a control device carrying a lamp, a companion photo-electric cell, and a vertical passage across the path of light from said lamp to said cell, container-supporting means mounted for movement in relation to the outlet of said passage and constructed and arranged to carry a plurality of containers in a row extending in the direction of movement of the container-supporting means, a relay operable under the control of said cell, means including a motor operable under the control of said relay in response to the passage of a substance through said passage for moving said container-supporting means intermittently to present said containers in succession in position to receive a quantity of liquid from said outlet, substance-receiving means movable from a retracted position to a projected position for intercepting the substance normally passing from said outlet to said containers, and means operable in response to a predetermined number of movements of said container-supporting means to move said substance-receiving means from said retracted position thereof to said projected position.

16. Apparatus of the character described comprising a control device carrying a lamp, a companion photo-electric cell, and a vertical passage across the path of light from said lamp to said cell, container-supporting means mounted for movement in relation to the outlet of said passage and constructed and arranged to carry a plurality of containers in a row extending in the direction of movement of the container-supporting means, a relay operable under the control of said cell, means including a motor operable under the control of said relay in response to the passage of a substance through said passage for moving said container-supporting means intermittently to present said containers in succession in position to receive a quantity of substance from said outlet, means movable from a retracted position to a projected position for intercepting the substance normally passing from said outlet to said containers, means operable in response to a predetermined number of movements of said container-supporting means to move said substance-intercepting means from said retracted position thereof to said projected position, and means operable in response to a predetermined number of movements of said container-supporting means to discontinue the operation of said moving means therefor.

17. Apparatus of the character described comprising a movable control device carrying a lamp, a companion photo-electric cell, and a vertical passage across the path of light from said lamp to said cell, container-supporting means mounted for movement in relation to the outlet of said passage and constructed and arranged to carry a plurality of containers in each of a plurality of laterally related rows extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a motor operable under the control of said relay in response to the passage of a liquid through said passage for moving said container-supporting means intermittently to present said containers of each row in succession in position to receive a quantity of liquid from said outlet, means for moving said control device from said one position thereof to said other position thereof, means operable under the control of said first mentioned moving means to actuate said last mentioned moving means for moving said control device to said other position thereof after a predetermined number of movements of said container-supporting means, means operable in response to a predetermined number of movements of said container-supporting means to discontinue the operation of said moving means therefor, liquid-receiving means movable from a retracted position to a projected position for intercepting the liquid normally passing from said outlet to said containers, and means operable in response to a predetermined number of movements of said container-supporting means to move said liquid-receiving means from said retracted position thereof to said projected position.

18. Apparatus of the character described comprising a movable control device carrying a lamp, a companion photo-electric cell, and a vertical passage across the path of light from said lamp to said cell, container-supporting means mounted for movement in relation to the outlet of said passage and constructed and arranged to carry a plurality of containers in each of a plurality of laterally related rows extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a Geneva gear mechanism for moving said container-supporting means intermittently to present said containers of each row in succession in position to receive a quantity of liquid from said outlet, a motor operable under the control of said relay in response to the passage of a substance through said passage for operating said Geneva gear mechanism, means for moving said control device from said one position thereof to said other position thereof, and means operable under the control of said first mentioned moving means to actuate said last mentioned moving means for moving said control device to said other position thereof after a predetermined number of movements of said container-supporting means, said last mentioned means including a lost motion gear mechanism operatively connected to said means for moving said control device.

19. Apparatus of the character described comprising a movable control device carrying a lamp, a companion photo-electric cell, and a vertical passage across the path of light from said lamp to said cell, container-supporting means mounted for movement in relation to the outlet of said passage and constructed and arranged to carry a plurality of containers in each of a plurality of laterally related rows extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a motor operable under the control of said relay in response to the passage of a substance through said passage for moving said container-supporting means intermittently to present said containers of each row in succession in position to receive a quantity of liquid from said outlet, means for moving said control device from said one position thereof to said other position thereof, means operable under the control of said first mentioned moving means to actuate said last mentioned moving means for moving said control device to said other position thereof after a predetermined number of movements of said container - supporting means, liquid - receiving means movable from a retracted position to a projected position for intercepting the liquid normally passing from said outlet to said containers, and means operable under the control of the circuit of said lamp and actuated when said circuit is interrupted for moving said liquid-receiving means from said retracted position thereof to said projected position.

20. Apparatus of the character described comprising a control device carrying a lamp, a companion photo-electric cell, and a vertical passage across the path of light from said lamp to said cell, container-supporting means mounted for movement in relation to the outlet of said passage and constructed and arranged to carry a plurality of containers in a row extending in the direction of movement of the container-supporting means, said control device being movable from a position in which the outlet of said passage is in vertical alignment with one of said rows to a position in which said outlet is in vertical alignment with another of said rows, a relay operable under the control of said cell, means including a motor operable under the control of said relay in response to the passage of a substance through said passage for moving said container-supporting means intermittently to present said containers in succession in position to receive a quantity of liquid from said outlet, liquid-receiving means movable from a retracted position to a projected position for intercepting the liquid normally passing from said outlet to said containers, and means operable under the control of the circuit for said lamp and actuated when said circuit is interrupted for moving said liquid-receiving means from said retracted position thereof to said projected position.

21. Apparatus of the character described comprising a movable control device carrying a lamp, a companion photo-electric cell, and a vertical passage across the path of light from said lamp to said cell, container-supporting means for rotation about a vertical axis and constructed and arranged to carry a plurality of containers in each of a plurality of radially spaced circular rows, said control device being movable from a position in which the outlet of said passage is in vertical alignment with one of said rows to a position in which said outlet is in vertical alignment with another of said rows, means operable under the control of said photo-electric cell in response to the passage of liquid through said passage for moving said container-supporting means intermittently to present said containers of each row in succession in position to receive a quantity of liquid from said outlet, means for moving said control device from said one position thereof to said other position thereof, and means operable under the control of said first mentioned moving means to actuate said last mentioned moving means for moving said control device to said other position thereof after a predetermined number of movements of said container-supporting means.

22. Apparatus of the character described comprising a movable control device carrying a lamp, a companion photo-electric cell, and a vertical passage across the path of light from said lamp to said cell, container-supporting means for rotation about a vertical axis and constructed and arranged to carry a plurality of containers in each of a plurality of radially spaced circular rows, said control device being movable from a position in which the outlet of said passage is in vertical alignment with one of said rows to a position in which said outlet is in vertical alignment with another of said rows, means operable under the control of said photo-electric cell in response to the passage of liquid through said passage for moving said container-supporting means intermittently to present said containers of each row in succession in position to receive a quantity of liquid from said outlet, means for moving said control device from said one position thereof to said other position thereof, and means operable under the control of said first mentioned moving means to actuate said last mentioned moving means for moving said control device to said other position thereof after a predetermined number of movements of said container-supporting means, said last mentioned moving means comprising a lost-motion mechanism actuated by said first mentioned moving means and operatively connected to said control device.

23. Apparatus of the character described comprising a movable control device carrying a lamp, a companion photo-electric cell, and a vertical passage across the path of light from said lamp to said cell, container-supporting means for rotation about a vertical axis and constructed and arranged to carry a plurality of containers in each of a plurality of radially spaced circular rows, said control device being movable from a position in which the outlet of said passage is in vertical alignment with one of said rows to a position in which said outlet is in vertical alignment with another of said rows, means operable under the control of said photo-electric cell in response to the passage of liquid through said passage for moving said container-supporting means intermittently to present said containers of each row in succession in position to receive a quantity of liquid from said outlet, means for moving said control device from said one position thereof to said other position thereof, means operable under the control of said first mentioned moving means to actuate said last mentioned moving means for moving said control device to said other position thereof after a predetermined number of movements of said container-supporting means, said last mentioned moving means comprising a gear mechanism actuated by said first mentioned moving means and operatively connected to said control device, and means operable in response to a predetermined number of movements of said container-supporting means to discontinue the operation of said moving means therefor.

24. Apparatus of the character described, comprising movable carrier means for supporting a plurality of receptacles in a row extending in the direction of movement of said carrier means, a material-supply device mounted in position at a receptacle-charging station, means for moving said carrier means step by step to carry said receptacles in succession to said station to receive a charge of material from said supply device, a motor for actuating said moving means, said moving means including a gear-shift mechanism for controlling the operative driving connection of said motor thereto and the operative driving connection of said moving means to said carrier means, indexing means operatively connected to said moving means to predetermine the number of step by step movements of said carrier means, and means manually operable to set said indexing means when said motor is operatively disconnected from said moving means.

25. Apparatus of the character described, comprising movable carrier means for supporting a plurality of receptacles in a row extending in the direction of movement of the carrier means, a material-supply device mounted in position at a receptacle-charging station, means for moving said carrier means step by step to carry said receptacles in succession to said station to receive a charge of material from said supply device, a motor for actuating said moving means, said moving means including a gear-shift mechanism for controlling the operative driving connection of said motor thereto and the operative driving connection of said moving means to said carrier means, indexing means operatively connected to said moving means to predetermine the number of step by step movements of said carrier means, means manually operable to set said indexing means when said motor is operatively disconnected from said moving means, and timing means for controlling the operations of said motor whereby to predetermine the duration of rest intervals of said carrier means between the successive step movements thereof.

26. Apparatus of the character described, comprising means providing a material-supply station, a carrier for supporting a plurality of receptacles laterally of each other in a row, means for moving said carrier to present said receptacles in succession at said supply-station to receive a charge of material, a motor for actuating said carrier-moving means, indexing means operatively connected to a part of said carrier-moving means for predetermining the extent of movement of said carrier means by said carrier-moving means, means for operatively disconnecting said motor from said carrier-moving means, and manually operable means for setting said indexing means when said motor is operatively disconnected from said carrier-moving means.

27. Apparatus of the character described, comprising means providing a material-supply station, a carrier for supporting a plurality of receptacles laterally of each other in a row, means for moving said carrier to present said receptacles in succession at said supply-station to receive a charge of material, a motor for actuating said carrier-moving means, indexing means operatively connected to a part of said carrier-moving means for predetermining the extent of movement of said carrier means by said carrier-moving means, means for operatively disconnecting said motor from said part of said carrier-moving means, and manually operable means for setting said indexing means when said motor is operatively disconnected from said carrier-moving means.

28. Apparatus of the character described, comprising a movable device having a material supply passage, carrier means for supporting a plurality of receptacles in a plurality of laterally related rows, means for moving said carrier means in relation to the outlet of said passage for presenting the receptacles in succession at a position to be supplied with material issuing from said outlet, and means operable automatically in response to a predetermined movement of said supporting means for moving said movable device laterally of said receptacle rows, whereby to position said device in material-supplying relation to the receptacles of one of said rows following the supply of material to the receptacles of another of said rows, said movable device being also movable laterally of said receptacle rows to a position beyond all of said rows under the control of said last mentioned means.

29. Apparatus of the character described, comprising means providing a material-supply station, a carrier for supporting a plurality of receptacles laterally of each other in a row, means for moving said carrier to present said receptacles in succession at said supply-station to receive a charge of material, a motor for actuating said carrier-moving means, adjustable indexing mechanism for predetermining the number of receptacle-charging operations at said supply station, and manually operable means for setting said indexing mechanism.

30. Apparatus of the character described, comprising a receptacle-carrier mounted for turning movement about an axis, said carrier being constructed and arranged to support a plurality of receptacles laterally of each other thereon with some of said receptacles nearer than others to said axis, a movable device having a passage for the supply of material from a source of supply to said receptacles and movable to position the outlet of said passage in registry with said receptacles which are nearer said axis and in registry with said other receptacles, and means operable in response to a predetermined turning movement of said carrier for moving said movable device, a motor operatively connected to said carrier for turning said carrier, and electrical control means including means carried by said movable device and responsive to the passage of material through said passage thereof for controlling the operation of said motor.

31. Apparatus of the character described comprising a carrier provided with means for holding a series of receptacles in laterally related rows, means for moving said carrier in the direction of said rows, means for mounting a liquid-drop supply device for movement laterally of said rows, said drop-supply device having an outlet with which the receptacles of each row register one at a time, means operable in response to the supply of a predetermined number of drops of liquid to one receptacle for moving said carrier to present the next receptacle of the same row to said supply device, said last mentioned means including a source of light and a photoelectric cell carried by said mounting means of said drop-supply device and disposed at opposite sides, respectively, of the path of the drops, and means operable in response to a predetermined movement of said carrier for moving said drop-supply device from one of said rows to another of said rows.

32. Apparatus of the character described, comprising a vertical shaft mounted for turning movement about its axis, a material supply member operatively connected to said shaft and movable thereby in a horizontal plane, said member having a passage provided with an inlet and an outlet for the passage of material therethrough, a carrier mounted for turning movement about a vertical axis spaced from said shaft and constructed and arranged to support a plurality of receptacles in lateral relation and at different distances from the said axis of the carrier whereby to present said receptacles seriatim to said outlet of said member in different positions, respectively, of the latter, and means automatically operable in response to a predetermined turning movement of said carrier for turning said shaft and thereby moving said member in said horizontal plane to a predetermined position in relation to said receptacles.

33. Apparatus of the character described, comprising a vertical shaft mounted for turning movement about its axis, a material supply member operatively connected to said shaft and movable thereby in a horizontal plane, said member having a passage provided with an inlet and an outlet for the passage of material therethrough, a carrier mounted for turning movement about a vertical axis spaced from said shaft and constructed and arranged to support a plurality of receptacles in lateral relation and at different distances from the said axis of the carrier whereby to present said receptacles seriatim to said outlet of said member in different positions, respectively, of the latter, and means automatically operable in response to a predetermined turning movement of said carrier for turning said shaft and thereby moving said member in said horizontal plane to a predetermined position in relation to said receptacles, means including a motor for turning said carrier intermittently with the intervening rest periods of the carrier occurring during the intervals of time when the receptacles receive material from said member, and timing means for controlling the operations of said motor whereby to predetermine the duration of said intervals.

34. Apparatus of the character described, comprising a vertical shaft mounted for turning movement about its axis, a material supply member operatively connected to said shaft and movable thereby in a horizontal plane, said member having a passage provided with an inlet and an outlet for the passage of material therethrough, a carrier mounted for turning movement about a vertical axis spaced from said shaft and constructed and arranged to support a plurality of receptacles in lateral relation and at different distances from the said axis of the carrier whereby to present said receptacles seriatim to said outlet of said member in different positions, respectively, of the latter, and means automatically operable in response to a predetermined turning movement of said carrier for turning said shaft and thereby moving said member in said horizontal plane to a predetermined position in relation to said receptacles, said member being also movable under the control of said last mentioned means to a position in which said outlet is clear of all of said receptacles laterally thereof.

35. Apparatus of the character described, comprising a vertical shaft mounted for turning movement about its axis, a material supply member operatively connected to said shaft and movable thereby in a horizontal plane, said member having a passage provided with an inlet and an outlet for the passage of material therethrough, a carrier mounted for turning movement about a vertical axis spaced from said shaft and constructed and arranged to support a plurality of receptacles in lateral relation and at different distances from the said axis of the carrier whereby to present said receptacles seriatim to said outlet of said member in different positions, respectively, of the latter, and means automatically operable in response to a predetermined turning movement of said carrier for turning said shaft and thereby moving said member in said horizontal plane to a predetermined position in relation to said receptacles, said member being also movable under the control of said last mentioned means to a position in which said outlet is clear of all of said receptacles laterally thereof, means including a motor for turning said carrier intermittently with the intervening rest periods of the carrier occurring during the intervals of time when the receptacles receive material from said member, and timing means for controlling the operations of said motor whereby to predetermine the duration of said intervals.

36. Apparatus of the character described comprising a rotary carrier means for supporting a plurality of receptacles in each of a plurality of laterally spaced circular rows, said rotary carrier means having means for positioning the receptacles with the inlet ends of groups of receptacles of different rows disposed along circumferentially spaced arcuately curved lines, respectively, a material supply device mounted for pivotal movement about the center of each of said arcuately curved lines, means for turning said carrier means to present the receptacles in each row to said supply device in predetermined positions, respectively, of the latter, and means operable in predetermined relation with the rotary movement of said carrier to move said supply device about said center from one of said predetermined positions, over one of said rows, to another of said predetermined positions, over another of said rows.

37. Apparatus of the character described comprising a rotary carrier means for supporting a plurality of receptacles in each of a plurality of laterally spaced circular rows, said rotary carrier means having means for positioning the receptacles with the inlet ends of groups of receptacles of different rows disposed along circumferentially spaced arcuately curved lines, respectively, a material supply device mounted for pivotal movement about the center of each of said arcuately curved lines, means for turning said carrier means step by step to present the receptacles in each row to said supply device in predetermined positions, respectively, of the latter, and means operable in predetermined relation with the rotary movement of said carrier to move said supply device about said center from one of said predetermined positions, over one of said rows, to another of said predetermined positions, over another of said rows.

38. Apparatus of the character described comprising a rotary carrier means for supporting a plurality of receptacles in each of a plurality of laterally spaced circular rows, said rotary carrier means having means for positioning the receptacles with the inlet ends of groups of receptacles of different rows disposed along circumferentially spaced arcuately curved lines, respectively, a material supply device mounted for pivotal movement about the center of each of said arcuately curved lines, means for turning said carrier means step by step to present the receptacles in each row to said supply device in predetermined positions, respectively, of the latter, and means operable in predetermined relation with the rotary movement of said carrier to move said supply device about said center from one of said predetermined positions, over one of said rows, to another of said predetermined positions, over another of said rows, and means for controlling the period of rest of said carrier means between said step movements thereof.

39. An automatic sampler for taking samples of liquid comprising in combination a rotatable circular framework provided with a plurality of concentric circles of openings adapted to receive sample containers, the openings being uniformly angularly spaced about the periphery of each circle, the openings in the different circles being so spaced that the corresponding openings in the various circles are arranged about an arc of a circle convex in the direction of movement of the framework, means for rotating the framework intermittently at predetermined intervals the angular movement being equal to the spacing of the openings in each circle, a pivoted filler tube adapted to register with successive openings and pivoted about the center of the circle on which the corresponding openings in the different circles are arranged, means carried by the framework adapted to engage the filler tube after filling of the last hole of any circle and on the next intermittent rotation of the framework to deflect the filler tube to the next hole of the adjacent circle.

40. A device according to claim 39 in which the framework is provided with teeth on its periphery and a periodically actuated escapement is provided registering with said tooth periphery and adapted on actuation to permit step by step movement thereof, the teeth having the same angular spacing as the openings in the framework.

41. An automatic sampler for taking samples of liquid comprising in combination a rotatable circular framework provided with a plurality of concentric circles of openings adapted to receive sample containers, the openings being uniformly angularly spaced about the periphery of each circle, the openings in the different circles being so spaced that the corresponding openings in the various circles are arranged about an arc of a circle, means for rotating the framework intermittently at predetermined intervals the angular movement being equal to the spacing of the openings in each circle, a pivoted filler tube adapted to register with successive openings and pivoted about the center of the circle on which the corresponding openings in the different circles are arranged, means carried by the framework adapted to engage the filler tube after filling of the last hole of any circle and on the next intermittent rotation of the framework to deflect the filler tube to the next hole of the adjacent circle.

42. Apparatus of the character described, comprising a movable device having a material supply passage, rotary support means for supporting a plurality of receptacles in a plurality of separate laterally related rows, means for turning said support means step by step in relation to the outlet of said passage for presenting the receptacles in succession at a position to be supplied with material issuing from said outlet, said movable device being mounted for movement in relation to said rotary support means laterally of said receptacle rows for disposing said outlet of said passage of said device over each of said rows of receptacles, respectively, for registering successively with the receptacles in each of said rows during said step-by-step movement of said rotary supporting means, and means operable automatically in response to a predetermined movement of said support means for moving said movable device laterally of said receptacle rows to position the outlet of said passage into registry with the receptacles in one of said rows following the supply of material from said outlet to another of said rows, whereby the same outlet passage is operable to supply the material to the receptacles in a plurality of said rows.

43. Apparatus of the character described, comprising a movable device having a material supply passage, rotary support means for supporting a plurality of receptacles in a plurality of separate laterally related rows, means for turning said support means step by step in relation to the outlet of said passage for presenting the receptacles in succession at a position to be supplied with material issuing from said outlet, said movable device being mounted for movement in relation to said rotary support means laterally of said receptacle rows for disposing said outlet of said passage of said device over each of said rows of receptacles, respectively, for registering successively with the receptacles in each of said rows during said step-by-step movement of said rotary supporting means, and means operable automatically in response to a predetermined movement of said support means for moving said movable device laterally of said receptacle rows to position the outlet of said passage into registry with the receptacles in one of said rows following the supply of material from said outlet to another of said rows, whereby the same outlet passage is operable to supply the material to the receptacles in a plurality of said rows, and means operable in response to a predetermined movement of said receptacle support to move said movable device to a position clear of said receptacle rows whereby to discontinue the supply of material to the receptacles of said rows.

44. Apparatus of the character described, comprising a pivotally movable device having a material supply passage, rotary support means for supporting a plurality of receptacles in each of a plurality of separate radially spaced circular rows, means for turning said support means step by step in relation to the outlet of said passage for presenting the receptacles in succession at a position to be supplied with material issuing from said outlet, said device being mounted for pivotal movement about an axis parallel to said rotary support means laterally of said receptacle rows for disposing said outlet of said passage of said device over each of said rows of receptacles, respectively, for registering successively with the receptacles in each of said rows during said step-by-step movement of said rotary supporting means, and means operable automatically in response to a predetermined movement of said supporting means for pivotally moving said movable device about said axis laterally of said receptacle rows to position the outlet of said passage into registry with the receptacles in one of said rows following the supply of material from said outlet to another of said rows, whereby the same outlet passage is operable to supply the material to the receptacles in a plurality of said rows.

45. Apparatus of the character described, comprising a pivotally movable device having a material supply passage, rotary support means for supporting a plurality of receptacles in each of a plurality of separate radially spaced circular rows, means for turning said support means step by step in relation to the outlet of said passage for presenting the receptacles in succession at a position to be supplied with material issuing from said outlet, said device being mounted for pivotal movement about an axis parallel to said rotary support means laterally of said receptacle rows for disposing said outlet of said passage of said device over each of said rows of receptacles, respectively, for registering successively with the receptacles in each of said rows during said step-by-step movement of said rotary supporting means, and means operable automatically in response to a predetermined movement of said supporting means for pivotally moving said movable device about said axis laterally of said receptacle rows to position the outlet of said passage into registry with the receptacles in one of said rows following the supply of material from said outlet to another of said rows, whereby the same outlet passage is operable to supply the material to the receptacles in a plurality of said rows, and means for discontinuing said movement of the receptacle support after a predetermined number of step-movements thereof.

46. In apparatus comprising means for supporting a plurality of receptacles in each of a plurality of laterally related rows, a movable device having a material-supply passage and mounted for movement laterally of said rows to positions for supplying material to the receptacles therein, respectively, and means for moving said receptacle supporting means to present the receptacles in each row successively to said movable device; means for positively moving said movable device to said positions, respectively, comprising a member mounted for turning movement and operatively connected to said device, means relatively movable in relation to said member and intermittently engageable therewith for turning the latter step-wise in one direction, and means operable in timed relation to said movement of the receptacle support for actuating said last mentioned means for moving said movable device to said positions thereof, respectively.

47. In apparatus comprising means for supporting a plurality of receptacles in each of a plurality of laterally related rows, a movable device having a material-supply passage and mounted for movement laterally of said rows to positions for supplying material to the receptacles therein, respectively, and means for moving said receptacle supporting means to present the receptacles in each row successively to said movable device; means for positively moving said movable device to said positions, respectively, comprising a member mounted for turning movement and operatively connected to said device, means relatively movable in relation to said member and intermittently engageable therewith for turning the latter step-wise in one direction, and means operable in timed relation to said movement of the receptacle support for actuating said last mentioned means for moving said movable device to said positions thereof, respectively, and means for releasably holding said member in stationary position during the intervals between said step-movements thereof.

48. In apparatus comprising means for supporting a plurality of receptacles in each of a plurality of laterally related rows, a movable device having a material-supply passage and mounted for movement laterally of said rows to positions for supplying material to the receptacles therein, respectively, and means for moving said receptacle supporting means to present the receptacles in each row successively to said movable device; means for positively moving said movable device to said positions, respectively, comprising a member mounted for turning movement and operatively connected to said device, means relatively movable in relation to said member and intermittently engageable therewith for turning the latter step-wise in one direction, and means operable in timed relation to said movement of the receptacle support for actuating said last mentioned means for moving said movable device to said positions thereof, respectively, and means operable after a predetermined number of step-movements of said member by said intermittently engageable means for moving said member to a retracted position in which said device is disposed clear of the receptacles on said support whereby to terminate the supply of material to the receptacles.

49. Apparatus of the character described, comprising a movable device having a material supply passage, means for supporting a plurality of receptacles in a plurality of laterally related rows, said supporting means being movable in relation to the outlet of said passage for presenting the receptacles in succession at a position to be supplied with material issuing from said outlet, and means in operative engagement with said movable device, said latter means being movable positively by said supporting means in lateral steps corresponding to the distance between said laterally related rows to position said device in material-supplying relation to the receptacles of one of said rows following the supply of material to the receptacles of another of said rows.

50. In apparatus comprising means for supporting a plurality of receptacles in each of a plurality of laterally related rows, a movable device having a material-supply passage and mounted for movement laterally of said rows to positions for supplying material to the receptacles therein, respectively, and means for moving said receptacle supporting means to present the receptacles in each row successively to said movable device; means for positively moving said movable device to said positions, respectively, comprising a member mounted for turning movement about a predetermined axis and operatively connected to said device, means mounted for movement about said axis and relatively movable in relation to said member and intermittently engageable therewith for turning the latter step-wise in one direction, and means operable in time relation to said movement of the receptacle support for actuating said last mentioned means for moving said movable device to said positions thereof, respectively.

GEORGE GORHAM.

REFERENCES CITED

The following references are of record in the file of this patent:

UNITED STATES PATENTS

| Number | Name | Date |
|---|---|---|
| 1,123,548 | Kanellos | Jan. 5, 1915 |
| 1,748,390 | Otto | Feb. 25, 1930 |
| 1,811,624 | Ford | June 23, 1931 |
| 2,049,722 | Phillips et al. | Aug. 4, 1936 |
| 2,493,382 | Bell | Jan. 3, 1950 |

FOREIGN PATENTS

| Number | Country | Date |
|---|---|---|
| 33,565 | Denmark | Aug. 8, 1924 |
| 325,376 | Great Britain | Feb. 20, 1930 |
| 574,794 | Germany | Apr. 20, 1933 |